ns Patented Nov. 5, 1968

3,409,626
INDOLYLETHYL PYRIDINIUM QUATERNARY
AMMONIUM COMPOUNDS
Chester John Cavallito and Allan Poe Gray, Decatur, Ill.,
assignors to Neisler Laboratories, Inc., Decatur, Ill., a
corporation of Delaware
No Drawing. Continuation of application Ser. No.
593,058, June 22, 1956. This application Sept. 17,
1963, Ser. No. 309,413
6 Claims. (Cl. 260—296)

This application is a continuation of application Ser. No. 593,058, filed June 22, 1956, now abandoned.

The present invention relates to unsymmetric bis-quaternary ammonium salts.

The invention resides in the concept of a composition of matter having a molecular structure wherein a polycarbon lower-alkane is substituted on different carbon atoms by a first quaternary ammonium moiety or grouping of relatively low radical weight, and is also substituted by a second quaternary ammonium moiety or grouping based on the pyridine ring and of relatively greater radical weight than the first grouping, together with processes of physically embodying such concept. The quaternary ammonium moieties are attached to the lower-alkane through the onium nitrogen atoms. The molecular structures, embraced by our inventive concept as above described, exclude any ionic substituents other than those constituting the two quaternary ammonium functions. The physical embodiments of this concept are solids having relatively high melting points and exhibit applied use characteristics in that they possess very unusual hypotensive activity of varying duration, and, ganglionic blocking properties, which two characteristics vary independently with relation to changes in molecular structure in any series of the various members or compounds of the composition.

The smaller moiety of the molecular consists of a cationic quaternary ammonium group and it is critical that the atoms of such moiety not exceed a total weight of about 117. The preferred substituents attached to the N-atom of this moiety are three lower-alkyl radicals from the group: methyl, ethyl, n-propyl, and isopropyl. Two of these radicals may be joined to form with the said N-atom a small heterocyclic radical, such as pyrrolidino, methyl-pyrrolidino and piperidino, and the heterocycle may include an oxygen or sulphur atom, as in the morpholino and thiamorpholino radicals.

The larger moiety of the molecule also is a cationic quaternary ammonium group which has a radical weight of at least 150, preferably in the range between about 175 and 350, and should contain a minimum of polar substituent radicals other than that of the aforementioned onium group. Fundamentally, the larger grouping involves a pyridine ring, and the pyridine ring can be substituted by a wide variety of radicals and may be partially or completely hydrogenated to eliminate unsaturation from the ring.

The lower-alkylene bridge between the two quaternary ammonium moieties has at least two and preferably not more than about six carbon atoms therein and can be straight or branched chain. The optimum pharmacological activity appears to reside in physical embodiments of the concept wherein the bridge has three carbon atoms.

The electrostatic charges of the two quaternary ammonium moieties are satisfied by the presence of two anions. The two anions may be the same or different. The precise nature of the anions is not material to the applied utility of the composition constituting the invention, since each anion serves merely to satisfy the otherwise unsatisfied electrostatic charges of the nitrogen atom and, since under the conditions of applied use in pharmacodynamic preparations, the quantity of any particular anion is insufficient to exert any significant physiological effect. Representative anions include halogens, sulfates, citrates, tartrates, acetates and phosphates.

The complete molecule may be illustrated diagrammatically:

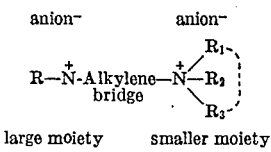

large moiety     smaller moiety

The smaller moiety of the molecular structure has a radical weight not exceeding 117 and is made up of a quaternary nitrogen atom bearing substituents ($R_1$, $R_2$, $R_3$) such as three lower-alkyl or lower-alkenyl groups, which are the same or different; or, the moiety is an N-heterocyclic radical, which heterocyclic radical may also include an oxygen or sulfur atom, having a lower-alkyl or lower-alkenyl radical also attached to the heterocyclic N-atom. The sum of the carbon atoms in the substituents attached to the quaternary N in the smaller moiety should not be greater than about 7, and preferably, at least one of said substituents is the methyl radical.

The smaller ammonium moiety is represented by such preferred examples as: trimethylammonium, methyldiethylammonium, dimethylethylammonium, methyldipropylammonium, dimethylisopropylammonium, methylethylpropylammonium, N-methylpyrrolidinium, N-ethylpyrrolidinium, N-methylpiperidinium, N-methylmorpholinium, N-methylthiamorpholinium and N-methylthiazolidinium. Other examples of the smaller moiety include: triethylammonium, N-ethylpiperidinium, N-propylpyrrolidinium, and N-ethylmorpholinium.

The larger moiety (RN) of the molecular structure has a radical weight of at least 150. The larger moiety is a substituted pyridine ring. The pyridine ring itself may be partially hydrogenated or fully hydrogenated. The substituents on the ring may be attached to any one or more of the available ring positions, except that when the pyridine ring is not partially or fully hydrogenated, the 2- and 6-positions of the ring cannot both have substituents attached thereat because quaternization is difficult, due to steric hindrance. While the substituents may contain various fused rings, they are not fused to the pyridine ring but are true substituents thereon. Since the unsubstituted pyridyl radical has a weight of 79, the weight of the substituents thereon must be such as to provide a total substituted pyridyl radical weight of at least 150 and preferably in the range between 150 and 350.

A minimum of polar radicals are substituted on the pyridine or hydrogenated pyridine radicals and, with this limitation, the substituents can be any organic radical or radicals having sufficient weight, including such varied types as: fused organic ring structures, aryl, branched chain alkyl, aralkyl, aralkoxy, aralkenyl, arylthioalkyl, diarylaminoalkyl, heterocycloalkyl, cycloalkyl, aryloxyalkyl, aralkoxyalkyl, aralkylthioalkyl, arylcarboxyalkyl, arylimidoalkyl and heterocyclic ring structures each connected to the pyridine ring directly or by means of a bridging linkage including linkages containing such varied groups as: carbonyl, alkane, alkene, ether, thioether, ester, amide, sulfono, et cetera. Not more than one ring atom of the substituted $C_5N$ ring, that is, the base pyridine ring, may form a part of another ring system.

The large ammonium moiety is represented by such preferred examples as: 2- and 4-(3-indolylethyl)-pyridinium, 2- and 4-(1-indolylethyl)-pyridinium, 2- and 4-(1-methyl-3-indolyl-2-ethyl)-pyridinium, 2-(3-indolylethyl)-5 - ethyl-pyridinium, 2 - 1 - methyl - 3 - indolylethyl) - 5 - ethylpyridinium, 2- and 4-(1-naphthylethyl)-pyridinium, and 2- and 4-(1-indenylethyl)-pyridinium.

Other examples include such large pyridinium moieties as:

2, 4 and 4-(1-naphthylethenyl)-pyridinium,
2- and 4-(2-naphthylethyl)-pyridinium,
2-, 3- and 4-(2-indolyl)-pyridinium,
2- and 4-(3-indolylethenyl)-pyridinium,
2-, 3- and 4-(3, 3'-diindolylmethyl)-pyridinium,
2- and 4-(1-benzotriazolylethyl)-pyridinium,
2-, 3- and 4-[6(bicyclo-[2.2.1]-2-heptenyl)]-pyridinium,
5-[6-(bicyclo-[2.2.1]-2-heptenyl)]-2-picolinium,
2-, 3- and 4-benzylpyridinium,
2-, 3- and 4-carboxanilidopyridinium,
2- and 4-benzoxypropyl)-pyridinium,
2-, 3- and 4-benzoylpyridinium,
2- and 4-stilbazolium,
2-, 3- and 4-(phenylthioethyl)-pyridinium,
2-, 3- and 4-(tert-butylthioethyl)-pyridinium,
2-, 3- and 4-(benzylthioethyl)-pyridinium,
3- and 4-carbobenzyloxypyridinium,
2- and 4-(diphenylaminoethyl)-pyridinium,
2- and 4-(phthalimidoethyl)-pyridinium,
2- and 4-hexylpyridinium,
2- and 4-decylpyridinium,
2- and 4-(2-oxocyclohexylethyl)-pyridinium,
2-(3,4-dichlorobenzyl)-pyridinium,
2-, 3- and 4-(diphenyl-methyl)-pyridinium,
3- and 4-(triphenylmethyl)-pyridinium,
2-, 3- and 4-(benzyloxyethyl)-pyridinium,
2- and 4-(9-fluorenyloxy-propyl)-pyridinium,
2-, 3- and 4-(benzyloxymethyl)-pyridinium,
2-, 3- and 4-(diphenylmethoxymethyl)-pyridinium,
2-, 3- and 4-(9-fluorenecarbovypropyl)-pyridinium,
2- and 4-[1-(l-benzyl-3-indolyl)-2-propyl]-pyridinium,
2- and 4-[beta-(1-methyl-3-indolyl)-alpha-cyclohexyl-ethyl]-pyridinium,
2- and 4-(1-methyl-3-oxindolylethyl)-pyridinium,
2-, 3- and 4-(2-benzothiazolyl-thioethyl)-pyridinium,
2-(2-pyridylamino)-pyridinium,
2- and 4-(9-fluorenylethyl)-pyridinium,
2- and 4-(9-fluorenyl)-pyridinium,
2- and 4-(3-benzothiophenylethyl)-pyridinium,
2- and 4-(9-carbazolylethyl)-pyridinium,
2- and 4-(3,4-dichlorophenylethyl)-pyridinium,
2,4-dibenzylpyridinium,
2,5-bis-(phenylthioethyl)-pyridinium,
2,4-bis-(phenylethyl)-pyridinium,
2- and 4-(2-thienylethyl)-pyridinium,
2- and 4-(2-furylethyl)-pyridinium,
2,4-bis-(2-furylethenyl)-pyridinium,
2- and 4-(2-benzofurylethyl)-pyridinium,
2- and 4-phenylpyridinium,
2- and 4-(2-naphthyl)-pyridinium,
2-(2-phthalimidionethyl)-5-ethylpyridinium,
2- and 4-(2-benzisosulfonazolylethyl)-pyridinium,
2-hexyl-5-ethylpyridinium,
2,4-bis-(2-pyrrolylethyl)-pyridinium,
2- and 4-(2-phenyl-1-pyrrolylethyl)-pyridinium,
2- and 4-(1-oxindolylethyl)-pyridinium,
2- and 4-(2-indanyl)-pyridinium, alpha-(2-indanylidene) 4-picolinium, alpha-(1-indanylidene)-2-picolinium, alpha-(cyclohexylidene)-4-picolinium,
4-beta-methyl-beta-phenylethenyl)-pyridinium,
2- and 4-(delta-phenylbutadienyl)-pyridinium,
2- and 4-(benzoylpropyl)-pyridinium, and
5-(cyclohexylthioethyl)-2-picolinium.

Also included are the 1-(lower-alkyl)-piperidinium large moieties corresponding to the above types in which the pyridine ring has been replaced by a 1-(lower alkyl)-piperidine ring; as well as piperidinium systems such as: spiro - [(1 - methyloxindole) - 3,4'-(1'-methylpiperidinium)], spiro - [fluorene - 9,4',(1'-methylpiperidinium], 1-benzylpiperidinium, 1-phenylethylpiperidinium, 1-(2 - hydroxy - 2 - phenylethyl) - piperidinium, 1-octylpiperidinium, 1 - dodecylpiperidinium, 1 - (2 - hydroxydecyl) piperidinium, 1 - (2 - hydroxyoctyl) - piperidinium, 1 - (2 - acetoxyoctyl) - piperidinium, and 1 - (2 - benzoxyoctyl) - piperidinium.

GENERAL METHODS FOR PREPARATION OF THE UNSYMMETRIC BIS-QUATERNARY AMMONIUM SALTS

The unsymmetric bis-quaternary salts of the present invention can be made by one or more of the following illustrative methods:

(A) Quaternization of substituted pyridine and piperidine bases with omega-haloalkyl ammonium salts This is a quaternization reaction. Examples 1–71 and 73–86 involve the use of this method.

Reagents: The substituted pyridine or piperidine base used forms the larger moiety of the desired end-product molecular configuration. The pyridine bases may be substituted in any or all of the 2-, 3-, 4-, and 5-positions. The 2,6-disubstituted pyridines generally are too unreactive to give good yields by this method. Piperidine bases must be N-substituted and may be 2-, 3-, 4-, and 5-substituted as well. The omega-haloalkyl ammonium salt is the halo salt of the balance of the desired end-product molecule (i.e., the smaller moiety plus the alkylene bridge portion). Many suitable haloalkyl quaternary salts are disclosed and claimed in a copending application Ser. No. 406,052, filed Jan. 25, 1954 and assigned to the assignee of the present application.

Proportions: Equimolar quantities or an excess of either of the reagents may be used, depending on availability of the starting materials and ease of purification of the product.

Solvents: Acetonitrile; aliphatic alcohols such as ethanol, dimethylformamide, methanol, isopropyl alcohol, propyl alcohol, isoamyl alcohol; nitrobenzene; nitroalkanes such as nitromethane and nitroethane; mixtures of dioxane and an alcohol; and, similar polar solvents and solvent mixtures; or, the reaction may be carried out with a large excess of the starting base taking the place of the solvent. For the preparation of the compounds of types illustrated by Examples 16–18, alcohols and alcohol-containing mixtures are preferred, although any of the listed polar solvents can be successfully employed.

Temperatures: Room temperature to 150 degrees centigrade at atmospheric pressure or in a sealed reaction vessel, with reflux at about 80 degrees centigrade being preferred. The lower temperatures of the range, with longer time is desirable since at above 200 degrees, reversal of quaternization becomes an undesirable complication.

(B) Condensation of aldehydes or ketones with pyridine unsymmetrical salt intermediates Unsymmetric bis-quarternary ammonium salts wherein the larger moiety is a substituted pyridyl radical can be prepared by the condensation reaction of an aldehyde or ketone with the reaction product of a 2- or 4-substituted pyridine containing a methylene function at the point of attachment to the pyridine ring, for example, 2-picoline, 4-picoline, 2,4-lutidine, ethylpyridine, et cetera, and a haloalkyl quarternary ammonium salt. This condensation reaction was used to prepare the compounds of Examples 87–90.

Reagents: The aldehydes may be aryl, aralkyl, or alkyl and any aldehyde is suitable whereof the sum of the 2- and 4-position radicals and the condensing radical meets the limitations hereinbefore set forth. Dimethylene ketones (e.g., acetone, methylethyl ketone, cyclohexanone and cyclopentanone) are also suitable. The particular aldehyde or ketone to be selected is that of the substituent substituted in the pyridine ring of the larger moiety of any desired end product within the scope of the said moiety as above disclosed.

Proportions: Equimolar quantities or an excess of the aldehyde or ketone may be used.

Catalyst: A small amount of basic catalyst is desirable. These include: strongly basic amines such as piperidine, diethylamine, di-n-butylamine; quarternary ammonium hydroxides such as one of the Tritons; inorganic bases such as sodium hydroxide, potassium hydroxide, barium hydroxide; or a sodium or potassium alkoxide.

Solvents: An alcohol or alcohol-containing mixture is preferred. Any of the previously mentioned alcohols of Method (A) are satisfactory.

Temperatures: Room temperature to 150 degrees centigrade at atmospheric pressure or in a sealed reaction vessel. Reflux at 50–80 degrees centigrade is preferred.

GENERAL METHOD OF PREPARATION OF STARTING MATERIALS (A) Preparation of substituted pyridine bases by additions of nucleophilic reagents with a labile hydrogen to 2- and 4-vinylpyridines Reagents: 2-vinylpyridine, 4-vinylpyridine or 2,4-divinylpyridine are operable. Substituted 2- or 4-vinylpyridines may also be employed but 3-vinylpyridines ordinarily produce poor yields.

A wide variety of nucleophilic reagents may be employed as the addendum: alkyl-, aryl-, or aralkyl-thiols; alkanols, aralkanols; phenols; diaryl amines; alkyl, aryl or aralkyl substituted secondary amides; heterocyclic substances such as 1- or 3-unsubstituted or 1- and 3-diunsubstituted indoles; N-unsubstituted imides; 1-unsubstituted triazoles; also operable are substances containing a labile C—H bond such as indene, diphenylmethane, phenylacetonitrile, ethyl phenylacetate, et cetera. In general, any of the reagents that can be added to alpha, beta-unsaturated carbonyl compounds will serve in the present additions.

Proportions: Equimolar quantities or an excess of either of the reagents (preferably the vinylpyridine) may be used.

Catalysts: The catalyst will depend to a large extent on the substance being added. With some reagents (e.g., idoles) an acid catalyst such as acetic acid is preferred (for reaction at the 3-positoin) but a basic catalyst is preferred for reaction at the 1-position of the indole. As to the other addendums, some can be made to add in the presence of an acid such as acetic acid or hydrochloric acid, but for most of these a basic catalyst is preferred. Basic catalysts include: quaternary ammonium hydroxides such as the Tritons; strongly basic amines such as piperidine or diethylamine; inorganic hydroxides such as sodium hydroxide, potassium hydroxide or barium hydroxide; alkali metals such as sodium, lithium or potassium, similar alkali metal alkoxides, amides or hydrides.

Solvents: These too depend on the addendum. 3-indolyl derivatives are best (but not necessarily) prepared in a glacial acetic acid or aqueous acetic acid solvent. Diaryl amines will also add in an acetic acid medium. Others of the substances will add in a wide variety of solvents such as aliphatic or aromatic hydrocarbons, alcohols, ethers, et cetera, or may be added in the absence of any solvent.

Temperatures: Depending on the reagent and presence or absence of solvent, temperatures ranging from room temperature to 200 degrees centigrade may be used.

(A–1) Preparation of substituted pyridine bases by the addition of 3-unsubstituted indole derivatives to 2- or 4-vinylpyridine bases in acid solution This reaction, preferably effected in acid (especially acetic acid solution), involves the addition of an indole (at the 3-position) to a 2- or 4-vinylpyridine. Preparations 5, 6, 8–13 are illustrative of this reaction.

(A–2) Preparation of substituted pyridine bases by the addition of various organic nitrogen compounds, at a free

group, to 2- or 4-vinylpyridine bases.

This reaction involves the addition at nitrogen of a compound of the type

in which R and $R_1$ are so constituted as to make the compound essentially neutral, to a 2- or 4-vinylpyridine. The compound may also be weakly acidic, e.g., imides, or weakly basic, e.g., diphenylamine. The nitrogen of the addendum may or may not be part of a heterocyclic ring. The addition may not require catalysis or may be effected by either basic (usually preferred) or acid catalysis. Preparations 14–18 are illustrative of this reaction.

(A–3) Preparation of substituted pyridine bases by the addition of compounds with a reactive >C—H group to 2- or 4-vinylpyridine bases This reaction involves the addition of a compound with a labile hydrogen attached to carbon to a 2- or 4-vinylpyridine base and is usually base catalyzed, although acid catalysis may be employed with certain types of substance. Preparations 20–22 are illustrative of this reaction.

(A–4) Preparation of substituted pyridine bases by the addition of alcohols to 2- or 4-vinylpyridine bases This reaction involves the base-catalyzed addition of an alcohol to a 2- or 4-vinylpyridine base. The alcohol may be an alkyl, aralkyl, aryl, et cetera, alcohol. Preparation 23 is illustrative of this reaction.

(B) Preparation of substituted pyridine bases by the addition of thiols to vinylpyridine derivatives The addition of a thiol to a vinylpyridine is a much more general reaction than the previously described additions of Preparation A, in that there is no limitation imposed on the position of the vinyl group, i.e., 2-, 3-, 4-, or 5-vinylpyridine bases may be employed. The pyridine may be multisubstituted, except that it must not be a 2,6-disubstituted pyridine because steric hindrance will then inhibit formation of the desired end product. Alkyl, cycloalkyl, aralkyl, aryl, or heterocyclic thiols may be used. The thiol additions may be effected without catalyst although it is sometimes preferable to use base catalysis or peroxide catalysis. Preparations 1–4 and 24–26 are illustrative of this reaction.

(C) Preparation of substituted pyridine bases by Diels-Alder addition to vinylpyridine Preparations 27–29 are illustrative of this method.

Reagents: 2-, 3- or 4-vinylpyridine or substituted vinylpyridines are operable. Any of the dienes which may ordinarily be used in Diels-Alder reactions may be employed, e.g., butadiene, substituted butadienes, cyclopentadiene, et cetera.

Conditions: Reaction conditions ordinarily used for Diels-Alder additions will serve. Preferred conditions involve the heating of the undiluted reagents in a sealed reaction vessel at temperatures from 50 to 150 degrees centigrade. For higher boiling dienes, reflux temperatures are satisfactory.

(D) Preparation of substituted piperidine bases by reduction of analogous pyridine bases Preparations 7 and 42–45 are illustrative of this method.
Reagents: Most of the substituted pyridine bases which have been described will serve.

Methods:

(1) The substituted pyridine is first converted to a simple quaternary salt with a lower-alkyl halide or aralkyl halide. This may be reduced either:

(a) Catalytically: The catalytic hydrogenation is preferably carried out using Adams platinum oxide catalyst in an alcoholic solvent or solvent mixture at about 40 pounds per square inch and room temperature. However, other possible catalysts include: other forms of platinum, palladium in its various forms and Raney nickel. Temperatures may be varied from room temperature to 150 degrees centigrade, and pressure from atmospheric pressure to 1500 pounds per square inch. Possible solvents include alcohols such as methanol, ethanol, isopropyl alcohol, glacial acetic acid or mixtures of these solvents with water, dioxane, ether, ethyl acetate, et cetera. When Raney nickel is the catalyst, it may be advantageous to add an amine such as dimethyl amine to the solution.

(b) Chemically: Chemical reduction of the quaternary salt may be carried out with zinc and hydrochloric acid, sodium and an alcohol ro any of the related chemical reducing agents.

(2) The substituted pyridine base is first reduced either catalytically as with the salts (the reduction may be slower with the free bases and, with platinum or palladium catalysts, are better carried out in an acid solution such as aqueous hydrochloric acid, acetic acid, or mixtures of these) or with sodium and an alcohol. The substituted piperidine may then be N-methylated (e.g., by the Eschweiler-Clarke procedure) or N-alkylated by reaction with a lower-alkyl halide or aralkyl halide.

(3) The substituted N-alkylpiperidine may be prepared in one step by catalytic hydrogenation of the corresponding pyridine base in the presence of an aldehyde or ketone (e.g., formaldehyde, acetaldehyde, acetone).

(E) Preparation of substituted pyridine and substituted piperidine bases by the esterification of pyridine alkanols and 1-alkylpiperidine alkanols These bases are prepared using standard esterification procedures. Preparations 30–32 are illustrative of this method.

(F) Preparation of substituted pyridine bases by the esterification of carboxylic acid derivatives of pyridines These bases are prepared using standard esterification procedures. Preparation 33 is illustrative of this method.

(G) Preparation of substituted pyridine bases by the alpha-carbon alkylation of 2- and 4-substituted pyridine derivatives This reaction involves the alkylation, in the presence of a strong base (e.g., sodium amide, phenyl lithium), of a 2- or 4-substituted pyridine having at least one hydrogen attached to the alpha-carbon atom, with an alkyl or aralkyl halide. Preparation 34 is illustrative of this method.

(H) Preparation of substituted pyridine and substituted piperidine bases by the reaction of the sodium salts of pyridine-alkanols and 1-alkylpiperidine-alkanols with alkyl and aralkyl halides This reaction involves ether formation from an alcohol and a halide under strongly basic conditions. Preparation 35 is illustrative of this method.

(I) Preparation of substituted pyridine bases from acylpyridine derivatives by the Fischer indole synthesis This reaction involves the cyclization under typical conditions (acid) for the Fischer indole synthesis of the arylhydrazone of an acylpyridine. Preparation 36 is illustrative of this method.

(J) Preparation of a substituted pyridine base by the condensation of 3-unsubstituted indole derivatives with pyridine aldehyde derivatives This reaction involves the condensation of two moles of an indole (at the 3-position) with one mole of a pyridine aldehyde, and is preferably carried out under mild acid (e.g., acetic acid) conditions. Preparation 38 is illustrative of this method.

(K) Preparation of substituted piperidine bases by reaction of 1-unsubstituted piperidine derivatives with tert-aminoalkyl halides This reaction, which involves the N-alkylation of a 1-unsubstituted piperidine by a tert-aminoalkyl halide to give a ditertiary base, is best carried out in the presence of at least one mole of a basic reagent such as sodium carbonate. Preparation 46 is illustrative of this method.

(L) Preparation of substituted piperidine bases by the reaction of 1-unsubstituted piperidine derivatives, with terminal epoxides or alkyl or aralkyl halides This reaction involves the substitution of the secondary nitrogen of a piperidine base by either (a) a terminal epoxide to yield a tertiary amino alcohol, or (b) a primary alkyl or aralkyl halide (in the presence of at least one mole of an added base). Preparations 47–55 are illustrative of these methods.

(M) Substituted pyridine and substituted piperidine bases prepared by Grignard addition to pyridine and piperidine derivatives possessing carbonyl substituents This reaction involves the addition, under typical Grignard conditions, of an alkyl, aryl or aralkyl Grignard reagent to a carbonyl substituted derivative of a pyridine or piperidine base. Preparation 56 is illustrative of this method.

(N) Preparation of acid addition and monoquaternary ammonium salts of substituted pyridine and substituted piperidine bases The acid addition salts of the bases are prepared in conventional manner by the contact interaction of the substituted pyridine or piperidine base with a hydrogen halide salt. The hydrochlorides described under Preparations 1, 3 and 7 exemplify this procedure.

The monoquaternary ammonium salts of substituted pyridine and piperidine bases are prepared in the conventional manner by quaternizing the substituted pyridine or piperidine base with an alkyl halide. An example of a monoquaternary salt is given under Preparation 44.

Preparation 1—4-(phenylthioethyl)-pyridine

A solution of 10.5 grams (0.1 mole) of freshly distilled 4-vinylpyridine and 11 grams (0.1 mole) of distilled thiophenol in 50 milliliters of Skellysolve 3 was stirred for one hour. During this period heat was evolved and the reaction mixture separated into two layers. The solvent was removed in vacuo and the residual oil distilled at 190 degrees centigrade (bath temperature) and 0.4 millimeter mercury pressure absolute, to yield 19.0 grams (88 percent of the theoretical yield) of 4-(phenylthioethyl)-pyridine having a refractive index $n_D^{25}$ of 1.6113.

Analysis.—Calculated: N, 6.51. Found: N, 6.36.

The hydrochloride salt of 4-(phenylthioethyl)-pyridine, obtained by the contact interaction of the free base and hydrogen chloride in ether, melted at 149–151 degrees centigrade.

Analysis.—Calculated: C, 62.01; H, 5.60; Cl, 14.08. Found: C, 61.73; H, 5.61; Cl, 13.42, 13.62.

Preparation 2—4-(n-propylthioethyl)-pyridine

Following the procedure of Preparation 1, 4-(n-propylthioethyl)-pyridine, boiling at 95–100 degrees centigrade at 0.2 millimeter of mercury pressure absolute, having a refractive index $n_D^{26}$ of 1.5370, was obtained by reacting propylmercaptan with 4-vinylpyridine.

Analysis.—Calculated: N, 7.73. Found: N, 7.67.

Preparation 3—4-(tert-butylthioethyl)-pyridine

To 0.5 gram of sodium dissolved in 100 milliliters of isopropyl alcohol was added 16.2 grams (0.18 mole) of tert-butyl mercaptan and then 15.8 grams (0.15 mole) of freshly distilled 4-vinylpyridine. The solution was refluxed for five hours on the steam bath and allowed to stand 16 hours at room temperature. After being acidified with ethereal hydrogen chloride, the solution was concentrated to dryness in vacuo and the residue taken up in aqueous alkali and extracted with ether. Stripping off the ether and distilling the residue yielded 22.9 grams (77 percent of the theoretical yield) of the product, 4-(tert-butylthioethyl)-pyridine, boiling at 83–86 degrees centigrade at a pressure of 0.4 millimeter, having a refractive index $n_D^{25}$ of 1.5273.

*Analysis.*—Calculated: N (basic), 7.17. Found: N (basic), 7.10.

The hydrochloride salt, 4-(tert-butylthioethyl)-pyridine hydrochloride was then obtained by the contact interaction of the free base and hydrogen chloride, and had a melting point of 126–128 degrees centigrade.

*Analysis.*—Calculated: C, 56.99; H, 7.82; Cl, 15.29. Found: C, 56.98; H, 7.73; Cl, 15.37.

Preparation 4—2-(phenylthioethyl)-pyridine

Following the procedure of Preparation 1, we obtained 2-(phenylthioethyl)-pyridine boiling at 118–121 degrees centigrade at 0.2 millimeter of pressure absolute, by reacting thiophenol and 2-vinylpyridine.

*Analysis.*—Calculated: N, 6.51. Found: N, 6.45.

The hydrochloride salt of 2-(phenylthioethyl)-pyridine, obtained by the contact interaction of the free base and hydrogen chloride, melted at 111–113 degrees centigrade.

*Analysis.*—Calculated: C, 62.01; H, 5.60; Cl, 14.08. Found: C, 61.91; H, 5.59; Cl, 13.77.

Preparation 5—4-(3-indolylethyl)-pyridine

A solution of 26.0 grams (0.25 mole) of 4-vinylpyridine (which may or may not contain a small amount of para t-butylcatechol as a stabilizer) and 23.4 grams (0.2 mole) of indole in 100 milliliters of glacial acetic acid was refluxed for three hours. The solution was concentrated in vacuo and the residue made weakly basic with dilute alkali. The resultant crystalline precipitate was collected and recrystallized from aqueous isopropyl alcohol to yield 30.6 grams (69 percent of the theoretical yield) or 4-(3-indolylethyl)-pyridine, melting at 149–151 degrees centigrade.

*Analysis.*—Calculated: N (basic), 6.30. Found: N (basic), 6.32.

By the contact interaction of 4-(3-indolylethyl)-pyridine and hydrogen chloride, 4-(3-indolylethyl)-pyridine hydrochloride was prepared which, after recrystallization from ethanol and ether, melted at 260–262 degrees centigrade.

*Analysis.*—Calculated: C, 69.62; H, 5.84; Cl, 13.70. Found: C, 69.78; H, 5.78; Cl, 13.28.

4-(3-indolylethyl)-pyridine methobromide, melting at 210–211 degrees centigrade, after recrystallization from ethanol and ether was also prepared by quaternizing the free base with methyl bromide.

*Analysis.*—Calculated: Br, 25.19. Found: Br, 24.85.

Then, 4-(3-indolylethyl)-pyridine ethobromide was prepared by quaternizing the free base with ethyl bromide and obtained as a hydroscopic glass.

*Analysis.*—Calculated: Br, 24.13. Found: Br, 24.07.

Preparation 6—2-(3-indolylethyl)-pyridine

A solution of 43 grams (0.41 mole) of freshly distilled 2-vinylpyridine and 35.1 grams (0.3 mole) of indole in 50 milliliters of glacial acetic acid was refluxed for three hours. The solution was concentrated and the residue dissolved in dilute hydrochloric acid. The aqueous acid solution was washed with ether, made weakly basic with dilute alkali and extracted with fresh ether. Drying and removal of the ether left a green-colored, crystalline residue which oiled out of aqueous isopropyl alcohol but solidified on standing. There was obtained 35.4 grams (53 percent of the theoretical yield) of 2-(3-indolylethyl)-pyridine, melting at 118–120 degrees centigrade, after distilling at 170–185 degrees centigrade at a pressure of 0.3 millimeter.

*Analysis.*—Calculated: N (basic), 6.30. Found: N (basic), 6.41.

2-(3-indolylethyl)-pyridine hydrochloride, melting at 157–159 degrees centigrade, after drying in vacuo over phosphorus pentoxide, was prepared by the contacting of 2-(3-indolylethyl)-pyridine and hydrogen chloride.

*Analysis.*—Calculated: C, 69.62; H, 5.84; Cl, 13.70. Found: C, 69.65; H, 6.07; Cl, 13.58.

Preparation 7—4-(3-indolylethyl)-1-methyl-piperidine

A solution of 8.0 grams (0.025 mole) of 4-(3-indolylethyl)-pyridine methobromide in 100 milliliters of absolute methanol was hydrogenated over platinum oxide (Adams catalyst) at room temperature and 40 pounds per square inch pressure. Seventy-one percent of the calculated amount of hydrogen was absorbed in 20 minutes. The filtered solution was evaporated to dryness and the residue dissolved in warm water. On making the solution weakly basic, a tan precipitate formed. This was collected and recrystallized from aqueous ethanol to yield 4.3 grams (69 percent of the theoretical yield) of 4-(3-indolylethyl)-1-methyl-piperidine as fine, white needles, melting at 172–173 degrees centigrade with decomposition.

*Analysis.*—Calculated: N (basic), 5.78. Found: N (basic), 5.70.

The hydrochloride salt of 4-(3-indolylethyl)-1-methyl-piperidine was obtained by contacting the free base and hydrogen chloride, and melted with decomposition at 206–208 degrees centigrade.

*Analysis.*—Calculated: C, 68.92; H, 8.31; Cl, 12.72. Found: C, 69.23; H, 8.06; Cl, 12.37.

Preparation 8—4-(1-methyl-3-indolylethyl)-pyridine

A solution containing 15.9 grams (0.12 mole) of N-methylindole and 15.7 grams (0.15 mole) of 4-vinylpyridine in 100 milliliters of glacial acetic acid was refluxed for 15 hours. The solution was concentrated in vacuo, diluted with 100 milliliters of ten percent hydrochloric acid and washed with ether. The cold aqueous solution was made basic by dropwise addition of dilute alkali, the resultant precipitate was filtered off and recrystallized from Skellysolve B. Yield of white crystalline product, 4-(1-methyl-3-indolylethyl)-pyridine, amounted to 13.5 grams (45 percent of the theoretical yield), melting at 85–87 degrees centigrade.

*Analysis.*—Calculated: N (basic), 5.93. Found: N (basic), 5.99.

By the contact interaction of 4-(1-methyl-3-indolylethyl)-pyridine and hydrogen chloride, 4-(1-methyl-3-indolylethyl)-pyridine hydrochloride, which melted with decomposition at 152–153 degrees centigrade, was obtained.

*Analysis.*—Calculated: C, 70.45; H, 6.28; Cl, 13.00. Found: C, 70.85; H, 5.87; Cl, 13.19.

Preparation 9—2-(3-indolylethyl)-5-ethylpyridine

A solution of 23.4 grams (0.2 mole) of indole and 29.5 grams (0.22 mole) of 2-vinyl-5-ethylpyridine in 100 milliliters of glacial acetic acid was refluxed for 3.5 hours. The solution was concentrated in vacuo, made basic with dilute alkali and the resultant oil extracted into ether. The ether extract was shaken well with dilute hydrochloric acid, the acid extract washed with fresh ether and finally made basic with dilute alkali. The oily precipitate was extracted into ether, dried over anhydrous sodium sulfate and concentrated in vacuo. The residue on cooling gave a gummy solid which was washed with Skellysolve B. Recrystallization from aqueous isopropanol gave 14.0 grams (28 percent of the theoretical yield) of white crystalline product, 2-(3-indolylethyl)-5-ethylpyridine, melting at 112–113 degrees centigrade.

*Analysis.*—Calculated: N (basic), 5.60. Found: N (basic), 5.61.

By the contact interaction of 2-(3-indolylethyl)-5-ethylpyridine and hydrogen chloride, 2-(3-indolylethyl)-5-ethylpyridine hydrochloride, which melted with decomposition at 164–166 degrees centigrade, was obtained.

*Analysis.*—Calculated: C, 71.19; H, 6.68; Cl, 12.36. Found: C, 70.96; H, 6.54; Cl, 11.94.

Preparation 10—2-(1-methyl-3-indolylethyl)-pyridine

Following the procedure of Preparations 8 and 9, and reacting N-methylindole with 2-vinylpyridine in acetic acid solution, 2 - (1 - methyl-3-indolylethyl)-pyridine was obtained as a yellow oil, boiling at 170–185 degrees centigrade at a pressure of 0.5 millimeter, having a refractive index $n_D^{25}$ of 1.6140.

*Analysis.*—Calculated: N (basic), 5.93. Found: N (basic), 6.12.

Preparation 11—2-(1-methyl-3-indolylethyl)-5-ethylpyridine

Following the procedure of Preparations 8 and 9, and reacting N-methylindole with 2-vinyl-5-ethylpyridine in acetic acid solution, 2-(1-methyl-3-indolylethyl)-5-ethylpyridine was obtained as a viscous yellow oil, boiling at 175–200 degrees centigrade at a pressure of 0.5 millimeter, having a refractive index $n_D^{24}$ of 1.5957.

*Analysis.*—Calculated: N (basic), 5.30. Found: N (basic), 5.57.

Preparation 12—4-(1-benzyl-3-indolylethyl)-pyridine

Following the procedure of Preparation 11, and reacting N-benzylindole with 4-vinylpyridine in acetic acid solution, 4-(1-benzyl-3-indolylethyl)-pyridine was obtained as a thick yellow oil, boiling at 225–230 degrees centigrade at a pressure of 0.3 milimeter.

*Analysis.*—Calculated: N (basic), 4.48. Found: N (basic), 4.51.

Preparation 13—2-[1-(1-methyl-3-indolyl)-2-propyl]-pyridine

Following the procedure of preparation 12, and reacting 1-methylindole with 2-isopropenylpyridine in acetic solution, 2 - [1 - (1-methyl-3-indolyl)-2-propyl]-pyridine was obtained.

Preparation 14—4-(diphenylaminoethyl)-pyridine

A mixture of 33.8 grams (0.2 mole) of diphenylamine, 10 milliliters of ethanol and one gram of sodium was heated on the steam bath for three hours. To the resultant slurry was added 42.0 grams (0.4 mole) of 4-vinylpyridine and the mixture was heated with stirring for an additional three hours. Then by acid extraction, followed by neutralization and distillation in vacuo, we obtained 4-(diphenylaminoethyl)-pyridine.

Preparation 15—4-(1-benzotriazolylethyl)-pyridine

A solution of 23.8 grams (0.2 mole) of benzotriazole, 21.2 grams (0.2 mole) of 4-vinylpyridine and three milliliters of Triton A-20 in 200 milliliters of isopropyl alcohol was refluxed (steam bath) for 18 hours. The solution was concentrated in vacuo and the residue distilled to yield 22.0 grams (49 percent of the theoretical yield) of the product, 4-(1-benzotriazolylethyl)-pyridine, boiling at 130–135 degrees centigrade at 0.4 millimeter of mercury pressure absolute, having a refractive index $n_D^{25}$ of 1.6083.

*Analysis.*—Calculated: N (basic), 6.25. Found: N (basic), 6.78.

Preparation 16—4-(phthalimidoethyl)-pyridine

A mixture of 15.9 grams (0.15 mole) of freshly distilled 4-vinylpyridine, 14.7 grams (0.1 mole) of phthalimide and 0.5 milliliter of piperidine was refluxed for three hours (oil bath). The cooled, solid reaction mixture was dissolved in dilute hydrochloric acid. The acid solution was filtered, made alkaline and the tan precipitate which formed was crystallized from aqueous ethanol to yield 9.7 grams (38 percent of the theoretical yield) of 4-(phthalimidoethyl)-pyridine, melting at 157–158 degrees centigrade.

*Analysis.*—Calculated: N (basic), 5.55. Found: N (basic), 5.94.

4-(phthalimidoethyl)-pyridine hydrochloride, melting at 220–230 degrees centigrade, was prepared by contacting 4-(phthalimidoethyl)-pyridine and hydrogen chloride.

*Analysis.*—Calculated: C, 62.39; H, 4.54; Cl, 1 Found: C, 62.81; H, 4.70; Cl, 12.27.

Preparation 17—4-(4,5,6,7-tetrachlorophthalimidethyl)-pyridine

A mixture of 14 grams (0.13 mole) of freshly distilled 4-vinylpyridine, 18.5 grams (0.07 mole) of tetrachlorphthalimide, one gram of potassium hydroxide and milliliters of water in 250 milliliters of xylene was refluxed (oil bath) for 48 hours. The product, 4-(4,5,6,7-tetrachlorophthalimidoethyl)-pyridine, was isolated as the hydrochloride salt, melting above 270 degrees centigrade.

*Analysis* (hydrochloride salt).—Calculated: C, 42.24; H, 2.13; Cl, 41.57. Found: C, 42.55; H, 2.01; Cl, 41.67.

Preparation 18—4-(1-indolylethyl)-pyridine

A solution of 52.4 grams (0.5 mole) of 4-vinylpyridine, 29.2 grams (0.25 mole) of indole, 0.5 gram of metallic sodium and 0.5 gram of cupric sulfate in 50 milliliters of ethanol was heated in a sealed tube at 140–150 degrees centigrade (bath temperature) for four hours. The cooled solution was filtered, concentrated in vacuo and the residue taken up in ether and extracted into acid; the acid solution was made alkaline and extracted with ether. Removal of the ether left a red oil which was distilled. Redistillation afforded 31.7 grams (57 percent of the theoretical yield) of the product, 4-(1-indolylethyl)-pyridine as an oil which crystallized on standing, boiling at 160–165 degrees centigrade at 0.1 millimeter pressure and melting at 41–45 degrees centigrade.

*Analysis.*—Calculated: N (basic), 6.30. Found: N (basic), 6.31.

By contacting 4-(1-indolylethyl)-pyridine with hydrogen chloride, we obtained 4-(1-indolylethyl)-pyridine hydrochloride, which melted with decomposition at 206–208 degrees centigrade.

*Analysis.*—Calculated: C, 69.62; H, 5.84; Cl, 13.70. Found: C, 69.46; H, 5.45; Cl, 13.83.

Preparation 19—2-(1-benzotriazolylethyl)-pyridine

Following the procedure of Preparation 15, but using 2-vinylpyridine in place of the 4-isomer, we obtained 2-(1-benzotriazolylethyl)-pyridine as a yellow oil.

Preparation 20—4-(1-indenylethyl)-pyridine

A mixture of 35.0 grams (0.3 mole) of freshly distilled indene and three milliliters of an ethanolic solution of sodium ethoxide was heated to 80 degrees centigrade and 47.0 grams (0.45 mole) of 4-vinylpyridine was added dropwise with stirring. Stirring was continued and the mixt was heated for sixteen hours at 80 degrees centigrade. reaction mixture was extracted with ethylene dichlor and the extract washed with water, dried and distilled fraction, boiling at 145–170 degrees centigrade at 0.3 r limeter, which immediately crystallized, was collected recrystallized from Skellysolve B (with charcoaling) give 16.3 grams (25 percent of the theoretical yield) the base, 4-(1-indenylethyl)-pyridine, melting at 96 degrees centigrade.

*Analysis.*—Calculated: N (basic), 6.36. Found: N (basic), 6.52.

Preparation 21—2-(1-indenylethyl)-pyridine

To 116 grams (1.0 mole) of indene and 2.0 grams of powdered sodamide in 300 milliliters of dry toluene, stirred and heated to reflux, was added, dropwise, 52.5 grams (0.5 mole) of 2-vinylpyridine in 50 milliliters of dry toluene. Stirring was continued and the reaction mixture was refluxed for five hours. The solution was separated from considerable tarry material and distilled in vacuo. Redistillation yielded 33.0 grams (30 percent of the theoretical yield) of 2-(1-indenylethyl)-pyridine, boiling at 145–155 degrees centigrade at a pressure of 0.5 millimeter, having a refractive index $n_D^{25}$ of 1.5987.

*Analysis.*—Calculated: N (basic), 6.33. Found: N (basic), 6.39.

The hydrochloride salt of 2-(1-indenylethyl)-pyridine was prepared by the contact interaction of the free base and hydrogen chloride and melted with decomposition at 147–149.5 degrees centigrade.

*Analysis.*—Calculated: C, 74.55; H, 6.26; Cl, 13.76. Found: C, 74.25; H, 6.19; Cl, 13.58.

Preparation 22—2-(1-methyl-3-oxindolylethyl)-pyridine

Following the procedure of Preparation 8, we refluxed an acetic acid solution of 2-vinylpyridine with an excess of 1-methyloxindole for 20 hours, distilling the product in vacuo to obtain 2-(1-methyl-3-oxindolylethyl)-pyridine.

Preparation 23—4-(benzyloxyethyl)-pyridine

To 0.6 gram of sodium hydride dissolved in 77.9 grams (0.72 mole) of benzyl alcohol was added 25.2 grams (0.24 mole) of freshly distilled 4-vinylpyridine and the resultant solution was heated for seven hours in an oil bath (bath temperature 165–175 degrees centigrade). The desired product, 4-(benzyloxyethyl)-pyridine was obtained by vacuum distillation of the crude basic fraction. Boiling point: 100 degrees centigrade at 1.0 millimeter. Refractive index: $n_D^{25}$ 1.5646.

Preparation 24—4-(benzylthioethyl)-pyridine

Following the procedure of Preparation 1, we reacted 4-vinylpyridine and benzyl mercaptan to obtain 4-(benzylthioethyl)-pyridine as a liquid boiling at 140 degrees centigrade at a pressure of 0.2 millimeter, having a refractive index $n_D^{26}$ of 1.5966.

*Analysis.*—Calculated: N (basic), 6.11. Found: N (basic), 5.97.

4-(benzylthioethyl)-pyridine hydrochloride melted at 139–142 degrees centigrade.

*Analysis.*—Calculated: Cl, 13.34. Found: Cl, 13.50.

Preparation 25—4-(9-fluorenethioethyl)-pyridine

Following the procedure of Preparation 1, we reacted 4-vinylpyridine with 9-fluorenethiol and obtained 4-(9-fluorenethioethyl)-pyridine, as a hydrate melting at 67–70 degrees centigrade. On drying over phosphorous pentoxide in vacuo, the compound melted and then crystallized again to a solid melting at 40–43 degrees centigrade. Its hydrochloride melted at 141–143 degrees centigrade.

Preparation 26—2-(2-benzothiazolethioethyl)-pyridine

Following the procedure of Preparation 3, we reacted 2-mercaptobenzothiazole with 2-vinylpyridine and obtained 2-(2-benzothiazolethioethyl)-pyridine as a solid which melted at 89–91 degrees centigrade.

*Analysis.*—Calculated: C, 61.73; H, 4.44; N, 5.14. Found: C, 61.58; H, 4.36; N, 5.20.

Preparation 27—4-[6-(bicyclo-[2.2.1]-2-heptenyl)]-pyridine

A mixture of 16.5 grams (0.25 mole) of freshly distilled cyclopentadiene and 31.5 grams (0.3 mole) of 4-vinylpyridine containing a small amount of para t-butylcatechol was heated in a sealed tube at steam-bath temperature for 65 hours. The deep red solution was diluted with 200 milliliters of ether, filtered and the filtrate exhaustively extracted with dilute hydrochloric acid. The aqueous extract was made alkaline and the oily precipitate taken into ether. Drying and removal of the ether followed by distillation of the residue yielded 10.8 grams (25 percent of the theoretical yield) of 4-[6-(bicyclo-[2.2.1]-2-heptenyl)]-pyridine boiling at 94–98 degrees centigrade at two millimeters of mercury pressure absolute, having a refractive index $n_D^{30}$ of 1.5558.

*Analysis.*—Calculated: N (basic), 8.18. Found: N (basic), 8.23.

The hydrochloride salt of 4-[6-(bicyclo-[2.2.1]-2-heptenyl)]-pyridine, prepared by contact interaction of the free base with hydrogen chloride, melted with decomposition at 192–193 degrees centigrade.

*Analysis.*—Calculated: C, 69.39; H, 6.79; Cl, 17.07. Found: C, 69.41; H, 6.85; Cl, 16.53.

Preparation 28—2-[6-(bicyclo-[2.2.1]-2-heptenyl)]-pyridine

Following the procedure of Preparation 27, we reacted 2-vinylpyridine in place of the 4-isomer, we obtained 2-[6-(bicyclo-[2.2.1]-2-heptenyl)]-pyridine as a liquid boiling at 96–100 degrees centigrade at a pressure of 3 millimeters, having a refractive index $n_D^{24}$ of 1.5547.

*Analysis.*—Calculated: N (basic), 7.56. Found: N (basic), 8.12.

Preparation 29—5-[6-(bicyclo-[2.2.1]-2-heptenyl)]-2-picoline

Following the procedure of Preparation 27, we reacted cyclopentadiene with 5-vinyl-2-picoline and obtained 5-[6-(bicyclo-[2.2.1]-2-heptenyl)]-2-picoline, as a liquid boiling at 114–116 degrees centigrade at a pressure of 2.5 millimeters, having a refractive index $n_D^{25}$ of 1.5505.

*Analysis.*—Calculated: N (basic), 7.56. Found: N (basic), 7.36.

Preparation 30—4-(benzoxypropyl)-pyridine

To 20.6 grams (0.15 mole) of 4-pyridinepropanol dissolved in a mixture of 55 milliliters of dry pyridine and 55 milliliters of benzene was added 30.7 grams (0.23 mole) of benzoyl chloride. The reaction mixture was refluxed for four hours on the steam bath, cooled to room temperature, diluted with ether, and the ether layer was washed with water and then with sodium carbonate solution. Acid extraction of the ether layer, basification, extraction back into ether, and distillation of the dried ether solution yielded 26 grams (72 percent of the theoretical yield) of the product 4-(benzoxypropyl)-pyridine, boiling at 145–147 degrees centigrade at a pressure of 0.4 millimeter, having a refractive index $n_D^{25}$ of 1.5570.

*Analysis.*—Calculated: N (basic), 5.81. Found: N (basic), 5.64.

The hydrochloride salt of 4-(benzoxypropyl)-pyridine, prepared by the contact interaction of the free base with hydrogen chloride, was a solid melting with decomposition at 133–135 degrees centigrade.

*Analysis.*—Calculated: C, 64.86; H, 5.81; Cl, 12.76. Found: C, 64.95; H, 5.79; Cl, 12.34.

Preparation 31—2-(benzoxypropyl)-pyridine

Following the procedure of Preparation 30, but using 2-pyridinepropanol instead of the 4-isomer, we obtained 2-(benzoxypropyl)-pyridine.

Preparation 32—3-(9-fluorenecarboxymethyl)-1-methylpiperidine

Following the procedure of Preparation 30, we reacted 9-fluorencarboxylic acid chloride with 1-methyl-3-piperidinemethanol and obtained 3-(9-fluorenecarboxymethyl)-1-methylpiperidine.

Preparation 33—benzyl 4-picolinate

To 18.5 grams (0.15 mole) of 4-picolinic acid was added 93 milliliters of thionyl chloride, dropwise with stirring. Stirring was continued and the mixture was heated for one hour on the steam bath. Excess thionyl chloride was removed by distillation and the last traces stripped off by the addition of benzene and distillation to dryness in vacuo. To the residue was added 81 grams of benzyl alcohol and the solution heated on the steam bath for five hours. The cooled solution was diluted with hydrochloric acid and excess benzyl alcohol removed by several washings with ether. The acid solution was made alkaline with sodium carbonate and extracted with chloroform. Distillation of the dried chloroform extract and redistillation of the crude material afforded 8.0 grams of the product, benzyl 4-picolinate, boiling at 108–112 degrees centigrade at a pressure of 0.2 millimeter, having a refractive index $n_D^{25}$ of 1.5650.

*Analysis.*—Calculated: N (basic), 6.57. Found: N (basic), 6.20.

Preparation 34—2-(3,4-dichlorophenylethyl)-pyridine

A solution of 59.6 grams (0.64 mole) of alpha-picoline in 100 milliliters of dry ether was treated with 35.7 grams (0.91 mole) of powdered sodamide and the mixture refluxed, with stirring, until salt formation was complete. Stirring was continued and 93.8 grams (0.48 mole) of alpha, 3,4-trichlorotoluene was rapidly added. After five hours reflux, distillation of the isolated basic materials yielded 2-(3,4-dichlorophenylethyl)-pyridine.

Preparation 35—3-(diphenylmethoxymethyl)-1-methylpiperidine

A mixture of 25.0 grams (0.19 mole) of 1-methyl-3-piperidinemethanol and 4.4 grams (0.19 mole) of metallic sodium in 25 milliliters of toluene was refluxed (oil bath), with stirring for two hours. Stirring of the suspension of the sodium salt was continued and 40.0 grams (0.20 mole) of benzhydryl chloride in 75 milliliters of toluene was added, dropwise, and the mixture refluxed for an additional five hours. The filtered solution was extracted with acid, the acid extract made alkaline and extracted with ether. Distillation yielded 16.1 grams of 3-(diphenylmethoxymethyl)-1-methylpiperidine, boiling at 170–173 degrees centigrade at 0.3 millimeter pressure, as a viscous oil.

*Analysis.*—Calculated: N (basic), 4.74. Found: N (basic), 4.62.

The hydrochloride salt of 3-(diphenylmethoxymethyl)-1-methylpiperidine was obtained in the form of hygroscopic crystals having an approximate melting point (sealed tube) of 110–115 degrees centigrade.

*Analysis.*—Calculated: C, 72.38; H, 7.90; Cl, 10.68. Found: C, 72.52; H, 7.43; Cl, 10.73.

Preparation 36—3-(2-indolyl)-pyridine

To the polyphosphoric acid, prepared from 36 grams of phosphorus pentoxide added to 20 grams of 85 percent phosphoric acid, was added 29.8 grams (0.14 mole) of the crude, powdered phenylhydrazone of 3-acetylpyridine. The mixture was stirred with a thermometer by hand and gradually heated in an oil bath until the internal temperature shot from 130 to 230 degrees centigrade. The reaction flask was removed from the oil bath and cooled under a cold water tap. The cold, solid mass was taken up in water and treated with solid sodium carbonate until the acid was completely neutralized and then exhaustively extracted with ethyl acetate. After removal of the solvent and repeated charcoaling and many recrystallizations from aqueous ethanol, there was obtained 5.55 grams of small brownish platelets of the product, 3-(2-indolyl)-pyridine, melting at 166–173 degrees centigrade.

*Analysis.*—Calculated: N (basic), 7.21. Found: N (basic), 6.86.

The hydrochloride salt of 3-(2-indolyl)-pyridine was obtained as a solid, melting with decomposition at 270–275 degrees centigrade.

*Analysis.*—Calculated: C, 67.68; H, 4.81; Cl, 15.37. Found: C, 68.02; H, 4.96; Cl, 15.03.

Preparation 37—4-(2-indolyl)-pyridine

Following the procedure of Preparation 36, but using 4-acetylpyridine in place of the 3-isomer, we obtained 4-(2-indolyl)-pyridine, melting at 203–206 degrees centigrade.

*Analysis.*—Calculated: N (basic), 7.21. Found: N (basic), 7.21.

4-(2-indolyl)-pyridine hydrochloride melted above 285 degrees centigrade.

*Analysis.*—Calculated: C, 67.68; H, 4.81; Cl, 15.37. Found: C, 67.62; H, 4.77; Cl, 14.86.

Preparation 38—4-(3,3'-diindolylmethyl)-pyridine

To a solution of 32.1 grams (0.3 mole) of 4-pyridinecarboxaldehyde in 150 milliliters of glacial acetic acid, cooled in an ice bath, was added 70.2 grams (0.6 mole) of indole. The mixture was allowed to warm to room temperature as the indole dissolved, a moderately exothermic reaction took place, and the resultant solution developed a deep violet color. After standing for 18 hours, the solution was diluted with aqueous hydrochloric acid to precipitate a purple hydrochloride salt which was recrystallized from ethanol-ether, and converted to the base. This was crystallized from benzene-ethanol with the addition of Skellysolve B to give 73 grams (75 percent of the theoretical yield) of yellow-orange crystals of the product, 4-(3,3'-diindolylmethyl)-pyridine, melting with decomposition at 152–155 degrees centigrade.

*Analysis.*—Calculated: N (basic), 4.33. Found: N (basic), 4.09.

The hydrochloride salt of 4-(3,3'-diindolylmethyl)-pyridine was obtained by the contact interaction of the free base and hydrogen chloride in the form of a purple tinted powder, melting with decomposition at 204–205 degrees centigrade.

*Analysis.*—Calculated: C, 73.43; H, 5.04; Cl, 9.85. Found: C, 73.70; H, 5.45; Cl, 9.30.

Preparation 39—3-(3,3'-diindolylmethyl)-pyridine

Following the procedure of Preparation 38, but using 3-pyridinecarboxaldehyde in place of the 4-isomer, we obtained 3-(3,3'-diindolylmethyl)-pyridine in the form of light yellow crystals, melting with decomposition at 130 degrees centigrade and above.

*Analysis.*—Calculated: N (basic), 4.33. Found: N (basic), 3.96.

The hydrochloride salt melted at 214–215 degrees centigrade.

*Analysis.*—Calculated: C, 73.43; H, 5.04; Cl, 9.85. Found: C, 73.29; H, 5.15; Cl, 9.04.

Preparation 40—2-(3,3'-diindolylmethyl)-pyridine

Following the procedure of Preparation 38, but using 2-pyridinecarboxaldehyde in place of the 4-isomer, we obtained 2-(3,3'-diindolylmethyl)-pyridine in the form of light green tinted crystals which melted with decomposition at 208–210 degrees centigrade.

*Analysis.*—Calculated: N (basic), 4.33. Found: N (basic), 4.23.

The hydrochloride salt melted with decomposition at 218–220.5 degrees centigrade.

*Analysis.*—Calculated: C, 73.43; H, 5.04; Cl, 9.85. Found: C, 73.31; H, 4.91; Cl, 9.68.

Preparation 41—4-[bis-(1-methyl-3-indolyl)-methyl]-pyridine

Following the procedure of Preparation 38, but using methylindole in place of indole, we obtained 4-[bis-(1-methyl-3-indolyl)-methyl]-pyridine as a solid melting with decomposition at 186–188 degrees centigrade.

*Analysis.*—Calculated: C, 82.02; H, 6.02. Found: C, 82.25; H, 5.94.

The hydrochloride salt melted with decomposition at 224–225 degrees centigrade.

*Analysis.*—Calculated: C, 74.31; H, 5.72; Cl, 9.14. Found: C, 74.59, 74.45; H, 5.47, 5.88; Cl. 8.74.

Preparation 42—4-(3-indolylethyl)-1-ethylpiperidine

Hydrogenation of 4-(3-indolylethyl)-pyridine ethobromide essentially as described in the foregoing Preparation 7, afforded a 59 percent yield of 4-(3-indolylethyl)-1-ethylpiperidine, melting at 125–126 degrees centigrade after recrystallization from Skellysolve B (an aliphatic hydrocarbon solvent).

*Analysis.*—Calculated: N (basic), 5.46. Found: N (basic), 5.51.

Preparation 43—4-(1-methyl-3-indolylethyl)-1-methylpiperidine

The base, 4-(1-methyl-3-indolylethyl)-pyridine was treated with methyl bromide as a quaternizing agent to yield 4-(1-methyl-3-indolylethyl)-1-methylpyridinium bromide, a hygroscopic solid.

*Analysis.*—Calculated: Br, 24.13. Found: Br, 24.81.

Following the procedure of Preparation 7, 4-(1-methyl-3-indolylethyl)-1-methylpyridinium bromide was hydrogenated to yield 4-(1-methyl - 3 - indolylethyl)-1-methylpiperidine as an oily solid, boiling at 155–162 degrees centigrade at a pressure of 0.5 millimeter.

*Analysis.*—Calculated: N (basic), 5.46. Found: N (basic), 5.73.

The contact interaction of the free base and hydrogen chloride yielded 4-(1-methyl - 3 - indolylethyl)-1-methylpiperidine hydrochloride as a hygroscopic, crystalline solid.

*Analysis.*—Calculated: Cl, 12.11. Found: Cl. 11.56.

Preparation 44—2-(1-methyl-3-indolylethyl)-1-methylpiperidine

The base, 2-(1-methyl - 3 - indolylethyl)-pyridine was treated with methyl bromide as a quaternizing agent to yield 2-(1-methyl - 3 - indolylethyl)-1-methylpyridinium bromide as a solid melting at 192–193 degrees centigrade.

*Analysis.*—Calculated: C, 61.63; H, 5.78; Br, 24.13. Found: C, 61.37; H, 5.99; Br, 23.89.

Following the procedure of Preparation 7, the pyridine monoquaternary salt above was hydrogenated to yield 2-(1-methyl - 3 - indolylethyl)-1-methylpiperidine as a low melting solid, boiling at 165–167 degrees centigrade at a pressure of 0.5 millimeter.

*Analysis.*—Calculated: N (basic), 5.46. Found: N (basic), 5.59.

The hydrochloride salt, 2-(1-methyl-3-indolylethyl)-1-methylpiperidine hydrochloride, was then obtained as in the previous preparations and melted with decomposition at 187–188 degrees centigrade.

*Analysis.*—Calculated: C, 69.72; H, 8.61; Cl, 12.11. Found: C, 69.72; H, 8.53; Cl, 11.87.

Preparation 45—4-[2-(bicyclo-[2.2.1]-heptyl)]-1-methylpiperidine

The monoquaternary salt, 4 - [6-(bicyclo - [2.2.1]-2-heptenyl)]-1-methylpyridinium bromide, was prepared by quaternizing the free base with methyl bromide and obtained as a hygroscopic solid. The pyridine monoquaternary salt was then hydrogenated, as in Preparation 7, to yield 4-[2-(bicyclo-[2.2.1]-heptyl)] - 1 - methylpiperidine which boiled at 82–84 degrees centigrade at a pressure of 0.3 millimeter, and had a refractive index $n_D^{24}$ of 1.4944.

*Analysis.*—Calculated: N (basic), 7.25. Found: N (basic), 7.24.

The hydrochloride salt of 4 - [2-(bicyclo - [2.2.1]-heptyl)]-1-methylpiperidine was then obtained by the contact interaction of the free base and hydrogen chloride, and was a solid melting with decomposition at 248–250 degrees centigrade.

*Analysis.*—Calculated: C, 67.65; H, 10.92; Cl, 15.36. Found: C, 67.92; H, 10.47; Cl, 15.16.

Preparation 46—1-(beta-dimethylaminoethyl)-4-benzylpiperidine

A stirred suspension consisting of 28.0 grams (0.16 mole) of 4-benzylpiperidine [W. L. C. Veer and St. Goldschmidt (Rec. trav. chim., 65 793 (1946); C.A. 41 3101 (1947)], 34.6 grams (0.24 mole) of beta-dimethylaminoethyl chloride hydrochloride and 50.0 grams of anhydrous powdered sodium carbonate in 200 milliliters of n-butyl alcohol was refluxed for 24 hours. The cooled solution was filtered and the filtrate concentrated in vacuo. The residue was diluted with ether, the resultant precipitate filtered off and the filtrate concentrated in vacuo. Vacuum distillation gave a small forerun and 12.3 grams (31 percent of the theoretical yield) of 1-(beta-dimethylaminoethyl)-4-benzylpiperidine, boiling at 135–140 degrees centigrade at 0.5 millimeter pressure having a refractive index $n_D^{24}$ of 1.5167.

*Analysis.*—Calculated: N (basic), 11.37. Found: N (basic), 11.22.

The dihydrochloride salt of 1 - (beta-dimethylaminoethyl)-4-benzylpiperidine was prepared in the conventional manner and melted above 270 degrees centigrade.

*Analysis.*—Calculated: C, 60.18; H, 8.84; Cl, 22.21. Found: C, 60.50; H, 8.71; Cl, 22.11.

Preparation 47—1-(2-hydroxy-1-octyl)-piperidine

To 14.8 grams (0.12 mole) of 1,2-epoxyoctane was added 50 milliliters of piperidine and 14.0 grams (0.12 mole) of piperidine hydrochloride. The solution was refluxed (oil bath) for 18 hours, cooled, diluted with ether and washed several times with water. The ether layer was extracted with dilute acid, the acid solution made alkaline and re-extracted with ether. Acidification of the dried ether layer with ethereal hydrogen chloride precipitated the hydrochloride salt of the product. Recrystallization of this from ethanol-ethyl acetate yielded 19.0 grams (66 percent of the theoretical yield) of the 1-(2-hydroxy-1-octyl)-piperidine hydrochloride salt, melting at 155–156 degrees centigrade.

*Analysis* (hydrochloride salt).—Calculated: C, 62.49; H, 11.29; Cl, 14.19. Found: C, 62.72; H, 11.07; Cl, 14.08.

The free base, 1-(2-hydroxy-1-octyl)-piperidine was obtained in the conventional manner by treatment of the hydrochloride salt with alkali.

Preparation 48—1-(2-acetoxy-1-octyl)-piperidine

A solution of 12.5 grams (0.05 mole) of 1-(2-hydroxy-1-octyl)-piperidine hydrochloride (from Preparation 47) and 30 milliliters of acetic anhydride in 60 milliliters of dry pyridine was stored at room temperature for four days. The solution was concentrated to dryness in vacuo, the residue dissolved in water, and the solution made alkaline with aqueous sodium carbonate and extracted with ether. Precipitation of the dried ether solution by the addition of ethereal hydrogen chloride and several recrystallizations of the precipitate from acetone-ether yielded 10.6 grams of the hydrochloride of the desired product, 1-(2-acetoxy-1-octyl)-piperidine, melting (gas evolution) at 136–137 degrees centigrade.

*Analysis* (hydrochloride salt).—Calculated: C, 61.72; H, 10.36; Cl, 12.15. Found: C, 61.82; H, 10.12; Cl, 12.07.

The free base, 1-(2-acetoxy-1-octyl)-piperidine was then obtained in the conventional manner by treatment of the hydrochloride salt with alkali.

Preparation 49—1-(2-benzoxy-1-octyl)-piperidine

A solution of 5.0 grams (0.02 mole) of the 1-(2-hydroxy-1-octyl)-piperidine hydrochloride described above (Preparation 47) and 3.4 grams (0.024 mole) of benzoyl chloride in 25 milliliters of dry pyridine was heated on a steam bath for three hours. The solution was concentrated to dryness in vacuo, the residue was dissolved in water, treated with aqueous sodium carbonate and extracted with ether. The washed and dried ether extract was acidified with ethereal hydrogen chloride and the precipitated salt recrystallized from acetone-ether to yield 5.5 grams of the hydrochloride salt of the product, 1-(2-benzoxy-1-octyl)-piperidine, as a hygroscopic solid, melting (gas evolution) at 90–93 degrees centigrade.

*Analysis* (hydrochloride salt).—Calculated: C, 67.87; H, 9.11; Cl, 10.02. Found: C, 67.54; H, 9.40; Cl, 10.11.

The free base, 1-(2-benzoxy-1-octyl)-piperidine, was then obtained in the conventional manner from the hydrochloride salt.

Preparation 50—1-(2-hydroxy-1-decyl)-piperidine

Following the procedure of Preparation 47, but using 1,2-epoxy-decane, the hydrochloride salt of 1-(2-hydroxy-1-decyl)-piperidine was obtained, as a solid melting at 155–156 degrees centigrade with gas evolution.

Analysis.—Calculated: C, 64.83; H, 11.61; Cl, 12.76. Found: C, 65.12; H, 11.71; Cl, 12.51.

The free base, 1-(2-hydroxy-1-decyl)-piperidine, was then obtained in the conventional manner from the hydrochloride salt.

Preparation 51—1-(2-acetoxy-1-decyl)-piperidine

Following the procedure of Preparation 48, but using 1-(2-hydroxy-1-decyl)-piperidine hydrochloride, we obtained 1-(2-acetoxy-1-decyl)-piperidine hydrochloride, melting at 140–142 degrees centigrade with gas evolution.

Analysis.—Calculated: C, 63.82; H, 10.71; Cl, 11.08. Found: C, 64.02; H, 10.50; Cl, 10.91.

The free base, 1-(2-acetoxy-1-decyl)-piperidine, was then obtained in the conventional manner from the hydrochloride salt.

Preparation 52—1-(2-hydroxy-1-dodecyl)-piperidine

Following the procedure of Preparation 47, but using 1,2-epoxy-dodecane, the hydrochloride salt of 1-(2-hydroxy-1-dodecyl)-piperidine was obtained as a solid melting at 153–154 degrees centigrade.

Analysis.—Calculated: C, 66.74; H, 11.86; Cl, 11.59. Found: C, 66.71; H, 11.69; Cl, 11.35.

The free base, 1-(2-hydroxy-1-dodecyl)-piperidine, was then obtained in the conventional manner from the hydrochloride salt.

Preparation 53—1-(2-acetoxy-1-dodecyl)-piperidine

Following the procedure of Preparation 48, but using 1-(2-hydroxy-1-dodecyl)-piperidine hydrochloride, we obtained 1-(2-acetoxy-1-dodecyl)-piperidine hydrochloride, melting at 134–135 degrees centigrade with gas evolution.

Analysis.—Calculated: C, 65.58; H, 11.00; Cl, 10.19. Found: C, 65.62; H, 11.19; Cl, 9.98.

The free base, 1-(2-acetoxy-1-dodecyl)-piperidine, was then obtained in the conventional manner from the hydrochloride salt.

Preparation 54—1-(2,11-dihydroxy-1-undecyl)-piperidine

To a cold solution of 0.19 mole of perbenzoic acid in 450 milliliters of chloroform was added 28.1 grams (0.17 mole) of 10-undecen-1-ol, and the solution stored in the refrigerator for 24 hours. The chloroform solution was washed with sodium carbonate solution, water, dried and distilled to yield 22.1 grams (72 percent of the theoretical yield) of 10,11-epoxy-1-undecanol, boiling at 126 degrees centigrade at 1.5 millimeters, low melting solid.

Refluxing this with a solution of piperidine hydrochloride in piperidine, as described in Preparation 47, yielded the product, 1-(2-11-dihydroxy-1-undecyl)-piperidine as the hydrochloride salt, melting at 127–128 degrees centigrade.

Analysis (hydrochloride salt).—Calculated: C, 62.41; H, 11.13; Cl, 11.51. Found: C, 62.16; H, 10.89; Cl, 11.28.

The free base, 1-(2,11-dihydroxy-1-undecyl)-piperidine, was then obtained in the conventional manner from the hydrochloride salt.

Preparation 55—1-(2,11-diacetoxy-1-undecyl)-piperidine

Following the procedure of Preparation 48, but using 1-(2,11-dihydroxy-1-undecyl)-piperidine hydrochloride, we obtained 1-(2,11-diacetoxy-1-undecyl)-piperidine hydrochloride, melting at 96–97 degrees centigrade.

Analysis.—Calculated: C, 61.28; H, 9.77; Cl, 9.04. Found: C, 61.45; H, 9.54; Cl, 8.82.

The free base, 1-(2,11-diacetoxy-1-undecyl)-piperidine, was then obtained in the conventional manner from the hydrochloride salt.

Preparation 56—1-(2-hydroxy-2-benzyl-4-butyl)-piperidine

To the Grignard reagent prepared from 30.4 grams (0.24 mole) of benzyl chloride and 5.8 grams (0.24 gram atom) of magnesium turnings in 150 milliliters of dry ether was added, dropwise with stirring, 31.1 grams (0.2 mole) of 4-piperidino-2-butanone in 25 milliliters of dry ether. Stirring was continued and the reaction mixture was refluxed for one hour. The Grignard salts were decomposed with saturated ammonium chloride solution, the ether layer was extracted with dilute hydrochloric acid, the acid solution made alkaline, extracted with ether and dried ether layer distilled to yield 16.5 grams (34 percent of the theoretical yield) of the product, 1-(2-hydroxy-2-benzyl-4-butyl)-piperidine, boiling at 115–118 degrees centigrade at 0.5 millimeter pressure, having a refractive index $n_D^{25}$ of 1.5186.

Analysis.—Calculated: N (basic), 5.66. Found: N (basic), 5.65.

The hydrochlororide salt of 1-(2-hydroxy-2-benzyl-4-butyl)-piperidine prepared by the contact interaction of the free base and hydrogen chloride, melted with gas evolution at 163–164 degrees centigrade.

Analysis.—Calculated: C, 67.69; H, 9.25; Cl, 12.49. Found: C, 67.50; H, 9.37; Cl, 12.14.

Preparation 57—4-(phenylcarbamyloxylthioethyl)-pyridine 4-(hydroxyethylthioethyl)-pyridine, boiling point 120 degrees centigrade at 0.5 millimeter, $n_D^{25}$ 1.5685, was prepared following the procedure of Preparation 1 and using mercaptoethanol and 4-vinylpyridine.

Analysis.—Calculated: N (basic), 7.64. Found: N (basic), 7.37.

4 - (hydroxyethylthioethyl) - pyridine hydrochloride melted at 127–129 degrees centigrade with gas evolution.

Analysis.—Calculated: C, 49.19; H, 6.42; Cl, 16.14. Found: C, 49.16; H, 6.27; Cl, 15.83.

To 2.85 grams (0.024 mole) of phenyl isocyanate was added 4.6 grams (0.025 mole) of 4-(hydroxyethylthioethyl)-pyridine. After the initial vigorous reaction had subsided the resultant yellow glass was warmed on the steam-bath for three minutes. Trituration with Skellysolve B followed by washing with several portions of anhydrous ether yielded 5.85 grams of 4-(phenylcarbamyloxyethylthioethyl)-pyridine, melting at 86.5–89.5 degrees centigrade.

The hydrochloride salt of 4 - (phenylcarbamyloxyethylthioethyl)-pyridine melted at 118–120 degrees centigrade.

Analysis.—Calculated: C, 56.71; H, 5.65; Cl, 10.46. Found: C, 56.95; H, 5.63; Cl, 10.39.

The following examples are illustrative of the processes and products of the present invention, but are not to be construed as limiting.

Example 1—1-(4-benzylpyridinium)-3-trimethylammonium)-propane dibromide

A solution of 10.4 grams (0.04 mole) of 3-bromopropyltrimethylammonium bromide and 9.0 grams (0.06 mole) of 4-benzylpyridine in 35 milliliters of acetonitrile was refluxed for six hours. The precipitate that had formed was collected and recrystallized from n-propyl alcohol and ethyl acetate to yield 7.6 grams (44 percent of the theoretical yield) of 1 - (4 - benzylpyridinium)-3-(trimethylammonium)-propane dibromide. After three additional recrystallizations from isopropyl alcohol the product melted at 172–174 degrees centigrade.

Analysis.—Calculated: C, 50.25; H, 6.09; Br, 37.15. Found: C, 50.32; H, 6.38; Br, 36.72.

Example 2—1-(2-benzylpyridinium)-3-(trimethylammonium)-propane dibromide

To 6.8 grams (0.026 mole) of 3-bromopropyltrimethylammonium bromide dissolved in isopropyl alcohol was added 6.8 grams (0.04 mole) of distilled 2-benzylpyridine and the solution was refluxed for 30 hours. Dilution of the cooled solution with ethyl acetate precipitated 1-(2-benzylpyridinium) - 3 - (trimethylammonium) - propane dibromide as a hygroscopic solid.

Example 3—1-[4-(t-butylthioethyl) - pyridinium]-3-(trimethylammonium)-propane dibromide Following the procedure of Example 1, we reacted 4-(t-butylthioethyl) - pyridine with 3-bromopropyltrimethylammonium bromide to obtain 1-[4-(t-butylthioethyl)-pyridinium]-3-(trimethylammonium)-propane dibromide in the form of a hygroscopic solid.

Example 4—1-[4-(n-propylthioethyl)-pyridinium]-3-(trimethylammonium)-propane dibromide Following the procedure of Example 1, we obtained 1-[4-(n-propylthioethy)-pyridinium] - 3 - (trimethylammonium)-propane dibromide in the form of a hygroscopic solid by the reaction of 4-(n-propylthioethyl)-pyridine. with 3-bromopropyltrimethylammonium propane.

Example 5—1-[4-benzoxypropyl)-pyridinium]-3-(trimethylammonium)-propane dibromide Following the procedure of Example 1, we obtained 1-[4 - benzoxypropyl) - pyridinium]-3-(trimethylammonium)-propane dibromide as a solid melting with decomposition at 225–226 degrees centigrade, by the reaction of 4-(benzoxypropyl)-pyridine with 3-bromopropyltrimethylammonium bromide.

*Analysis.*—Calculated: C, 50.21; H, 6.02; Br. 31.82. Found: C, 50.20; H, 5.94; Br, 31.30.

Example 6—1-[4-carbobenzyloxy)-pyridinium]-3-(trimethylammonium)-propane dibromide Following the procedure of Example 1, we obtained 1-[4-(carbobenzyloxy) - pyridinium] - 3 - (trimethylammonium) - propane dibromide by reacting benzyl-4-picolinate with 3-bromopropyltrimethylammonium bromide.

Example 7—1-[4-(phenylthioethyl)-pyridinium]-3-(trimethylammonium)-propane dibromide Following the procedure of Example 1, 1-[4-(phenylthioethyl) - pyridinium] - 3 - (trimethylammonium)-propane dibromide, melting at 170–172 degrees centigrade was prepared by reacting 4-(phenylthioethyl) - pyridine with 3-bromopropyltrimethylammonium bromide.

*Analysis.*—Calculated: C, 47.91; H, 5.92; Br, 33.55. Found: C, 47.35; H, 5.83; Br, 34.00.

Example 8—1 - [2 - (phenylthioethyl) - pyridinium] - 3 - (trimethylammonium)-propane dibromide Following the procedure of Example 1, 1-[2-(phenylthioethyl) - pyridinium] - 3 - (trimethylammonium) - propane dibromide, a hygroscopic solid, was prepared from 2-(phenylthioethyl)-pyridine and 3-bromopropyltrimethylammonium bromide.

*Analysis.*—Calculated: Br, 33.55. Found: Br, 33.20.

Example 9—1 - (4 - benzylpyridinium) - 3 - (1 - methyl-pyrrolidinium)-propane dibromide Following the procedure of Example 1, we obtained 1 - (4 - benzylpyridinium) - 3 - (1 - methylpyrrolidinium)-propane dibromide, a hygroscopic solid, by reacting 4-benzylpyridine with 3-bromopropyl-1-methylpyrrolidinium bromide.

*Analysis.*—Calculated (+1 H₂O): Br, 33.70. Found: Br, 33.85.

Example 10—1-(4-benzylpyridinium)-3-(1-methylpiperidinium)-propane dibromide

Following the procedure of Example 1, we obtained 1 - (4 - benzylpyridinium) - 3 - (1 - methylpiperidinium)-propane dibromide, melting at 227–230 degrees centigrade, by reacting 4-benzylpyridine with 3-bromopropyl-1-methylpiperidinium bromide.

*Analysis.*—Calculated (+½ H₂O): C, 52.61; H, 6.53; Br, 33.34; H₂O, 1.85. Found: C, 52.19; H, 6.12; Br, 32.77; H₂O, 1.02.

Example 11—1-(4-benzylpyridinium)-6-(trimethylammonium)-hexane dibromide

Following the procedure of Example 1, we obtained 1 - (4 - benzylpyridinium) - 6 - (trimethylammonium)-hexane dibromide by reacting 4-benzylpyridine with 6-bromohexyltrimethylammonium bromide.

Example 12—1-[4-(diphenylaminoethyl)-pyridinium]-3-(trimethylammonium)-propane dibromide Following the procedure of Example 1, we obtained 1-[4-(diphenylaminoethyl) - pyridinium] - 3 - (trimethylammonium)-propane dibromide by reacting 4-(diphenylaminoethyl)-pyridine with 3-bromopropyltrimethylammonium bromide.

Example 13—1 - [2 - (2 - oxocyclohexylethyl) - pyridinium]-3-(trimethylammonium)-propane dibromide Following the procedure of Example 1, we reacted 2-(2-oxocyclohexylethyl)-pyridine with 3-bromopropyltrimethylammonium bromide and we obtained 1-[2-(2-oxocyclohexylethyl) - pyridinium] - 3 - (trimethyl - ammonium)-propane dibromide in the form of a hygroscopic solid.

Example 14—1-(4-benzoylpyridinium)-3-(trimethylammonium)-propane dibromide

Following the procedure of Example 1, we reacted 4-benzoylpyridine with 3-bromopropyltrimethylammonium bromide and we obtained 1-(4-benzoylpyridinium)-3-trimethylammonium)-propane dibromide in the form of a solid melting with decomposition at 221–222 degrees centigrade.

*Analysis.*—Calculated (+½ H₂O): C, 47.69; H, 5.57; Br, 35.26; H₂O, 1.99. Found: C, 47.97; H, 5.63; Br, 35.52; H₂O, 2.80.

Example 15—1 - [4 - (4,5,6,7 - tetrachlorophthalimidoethyl) - pyridinium]-3-(trimethylammonium - propane dibromide Following the procedure of Example 1, we reached 4-(4,5,6,7 - tetrachlorophthalimidoethyl) - pyridine and 3-bromoproplytrimethylammonium bromide and thus obtained 1 - [4 - (4,5,6,7 -tetrachlorophthalimidoethyl)-pyridinium]-3-(trimethylammonium)-propane dibromide.

Example 16—1-(4-benzyl-1-methylpiperidinium)-3-(trimethylammonium)-propane dibromide A solution of 7.0 grams (0.037 mole) of 4-benzyl-1-methylpiperidine and 10.5 grams (0.04 mole) of 3-bromopropyltrimethylammonium bromide in 50 milliliters of isopropylalcohol was refluxed for 24 hours. The crystalline precipitate obtained on dilution with ethyl acetate was recrystallized twice from isopropyl alcohol and ethyl acetate to yield 8.6 grams (50 percent of the theoretical yield) of 1 - (4 - benzyl - 1 - methylpiperidinium) - 3 - (trimethylammonium)-propane dibromide, melting at 237–238 degrees centigrade.

*Analysis.*—Calculated: C, 50.67; H, 7.61; Br, 35.49. Found: C, 50.58; H, 7.73; Br, 35.03.

Example 17—1-(2-benzyl-1-methylpiperidinium)-3-(trimethylammonium)-propane dibromide We reacted 2-benzyl-1-methylpiperidine with 3-bromopropyltrimethylammonium bromide in a manner similar to that described in Example 16 and obtained 1-(2-benzyl-1 - methylpiperidinium) - 3 - (trimethylammonium) - propane dibromide as a white hygroscopic solid.

*Analysis.*—Calculated: Br, 35.49. Found: Br, 35.13.

Example 18—1 - [4 - (3 - hydroxypropyl) - 1 - methylpiperidinium] - 3 - (trimethylammonium) - propane dibromide In a manner similar to that of Example 16, 4-(3-hydroxypropyl)-1-methylpiperidine was quaternized with 3-bromopropyltrimethylammonium bromide, and recrystallized from ethanol and ethyl acetate. There was thus obtained about 43 percent of the theoretical yield of product, 1 - [4 - (3 - hydroxypropyl) - 1-methylpiperidinium] - 3 - (trimethylammonium) - propane dibromide, melting at about 250 degrees centigrade.

*Analysis.*—Calculated: C, 43.07; H, 8.19; Br, 38.21. Found: C, 42.93; H, 8.02; Br, 37.93.

Example 19—1-[4-(3-indolylethyl)-pyridinium]-3-(trimethylammonium)-propane dibromide A solution of 6.4 grams (0.028 mole) of 4-(3-indolylethyl)-pyridine and 7.9 grams (0.08 mole) of 3-bromopropyltrimethylammonium bromide in 50 milliliters of acetonitrile was refluxed on the steam bath for 28 hours. The crystalline precipitate was collected and recrystallized twice from ethanol and ethyl acetate to yield 8.7 grams (65 percent of the theoretical yield) of 1-[4-(3-indolylethyl) - pyridinium] - 3 - (trimethylammonium)-propane dibromide, pale green crystals, melting with gas evolution at 218 degrees centigrade.

*Analysis.*—Calculated: C, 52.18; H, 6.05; Br, 33.07. Found: C, 52.74; H, 6.25; Br, 33.05.

This compound was tested on laboratory animals and humans with the following results:

I. Hypotensive effects in anesthetized dogs (following standard test procedure).

| Dose (mg./kg., I.V.) | Percent B.P. Fall | Duration (hours) |
| --- | --- | --- |
| 0.05 | 15 | ½ |
| 0.1 | 40–65 | >3 |
| 0.25 | 40–65 | 4 |
| 0.5 | 40–65 | >4 |

Note.—The onset of hypotensive action of this compound is quite slow.

II. Acute toxicity—mice, mg./kg. [by procedure of B. Behrens and G. Karber published in the Archives for Experimental Pathology and Pharmacology, 177 page 379 (1934)].

I.V. $LD_{50}=9.0$

III. Ganglionic Blockade—cat, superior cervical ganglia [by procedure of G. H. Acheson and S. A. Pereira, published in the Journal of Pharmacology and Experimental Therapeutics, 87 page 273 (1946)].

| Dose (mg./kg., I.V.) | Degree (0–4+) | Duration (to complete recovery) |
| --- | --- | --- |
| 0.1 | + | <1 hour. |
| 0.25 | +++ | 1 hour. |

Note.—Two cats showed less blockade after application of the compound, but these same cats were less sensitive than usual to hexamethonium.

IV. Effect on pupil—cat, male, unanesthetized (by standard intra-peritoneal injection).

| Dose (mg./kg., I.P.) | Dilatation | Reaction to Light |
| --- | --- | --- |
| 0.25 | Partial | Partial. |
| 0.5 | Marked | Slight. |

V. Effects when administered I.V. to an unanesthetized monkey.

Monkey—Approximately 5 kg. male.
Dose=5 mg. total dose.
Results: No immediate effects noted. After 30 minutes, there appeared to be a slight dilatation of the pupils and the animal was quieter. Evidence of dry mouth or postural hypotension could not be noted grossly.

VI. Test on 8 human hypertensive patients (by intravenous injection in isotonic saline solution).

Intravenous average dose (mg./kg.)—0.5.
Average percent B.P. fall—supine, 20; erect, 33.

Example 20—1-[4-(1-benzotriazolylethyl)-pyridinium]-3-(trimethylammonium)-propane dibromide In a manner similar to that described in the preceding Example 19, 4-(1-benzotriazolylethyl)-pyridine was reacted with 3-bromopropyltrimethylammonium bromide in ethanol solution. Recrystallization from ethanol and ether and then from isopropyl alcohol afforded 1-[4-(1-benzotriazolylethyl) - pyridinium] - 3 - (trimethylammonium)-propane dibromide as a white, crystalline solid.

*Analysis.*—Calculated (+1 $H_2O$): C, 45.34; H, 5.81; Br, 31.76. Found: C, 45.57; H, 6.03; Br, 31.91.

Example 21—1-[2-(3-indolylethyl)-pyridinium]-3-(trimethylammonium)-propane dibromide We obtained 1 - [2-(3-indolylethyl)-pyridinium]-3-trimethylammonium)-propane dibromide, melting at 201–203 degrees centigrade, by following the procedure of Example 19 and reacting 2-(3-indolylethyl)-pyridine with 3-bromopropyltrimethylammonium bromide.

*Analysis.*—Calculated: C, 52.18; H, 6.05; Br, 33.07. Found: C, 52.23; H, 6.17; Br, 32.51.

This compound was tested on laboratory animals and humans with the following results:

I. Hypotensive effects in anesthetized dogs (following standard test procedure).

| Dose (mg./kg., I.V.) | Percent B.P. Fall | Duration (hours) |
| --- | --- | --- |
| 0.025 | 25 | 2 |
| 0.05 | 65 | 5 |
| 0.1 | 65 | >3½ |
| 1.0 | 65–70 | >4 |
| 0.25 [1] | 35–45 | >3½ |

[1] Injected into small intestine.

II. Acute toxicity—mice, mg./kg. [by procedure of B. Behrens and G. Karber published in the Archives for Experimental Pathology and Pharmacology, 177 page 379 (1934)].

I.V. $LD_{50}=13\pm1$ mg./kg.

III. Ganglionic blockade—cat, superior cervical ganglia [by procedure of G. H. Acheson and S. A. Pereira, published in the Journal of Pharmacology and Experimental Therapeutics, 87 page 273 (1946)].

| Dose (mg./kg., I.V.) | Degree (0–4+) | Duration (to recovery) |
| --- | --- | --- |
| 0.05 | 0 | 0. |
| 0.1 | + | 30 min. |
| 0.25 | +++ | 1 hour. |
| 0.5 | ++++ | ?. |

IV. Effect on pupil—cat, male, unanesthetized (by standard intra-peritoneal injection).

| Dose (mg./kg., I.P.) | Dilatation | Reaction to Light |
| --- | --- | --- |
| 0.25 | Partial | Partial. |
| 0.5 | Maximal | None. |

V. Effects when administered I.V. to an unanesthetized monkey.

Monkey—6.6 kg. male.
Dose=5 mg. (0.75 mg./kg.)
Results: No immediate effects. There was no later effects noted except possibly slight dilatation of the pupils after 30 minutes. As would be expected, the animal was quieter.

VI. Test on 4 human hypertensive patients (by intravenous injection in isotomic saline solution).

Intravenous average dose (mg./kg.)—0.13.
Average percent B.P. fall—supine, 20; erect, 30.

Example 22—1-[4-phthalimidoethyl)-pyridinium]-3-(trimethylammonium)-propane dibromide We obtained 1-[phthalimidoethyl)-pyridinium]-3-(trimethylammonium)-propane dibromide, melting at 204 degrees centigrade, by following the procedure of Example 19, and reacting 4-phthalimidoethyl-pyridine with 3-bromopropyltrimethylammonium bromide.

*Analysis.*—Calculated: C, 49.14; H, 5.30; Br, 31.14. Found: C, 49.46; H, 5.32; Br, 30.89.

Example 23—1-[4-(1-indenylethyl)-pyridinium]-3-(trimethylammonium)-propane dibromide We obtained 1-[4-(1-indenylethyl)-pyridinium]-3-(trimethylammonium)-propane dibromide, melting at 196–197 degrees centigrade, by following the procedure of Example 19, and reacting 4-(1-indenylethyl)-pyridine with 3-bromopropyltrimethylammonium bromide.

*Analysis.*—Calculated: C, 54.78; H, 6.27; Br, 33.14. Found: C, 54.52; H, 6.48; Br, 33.05.

Example 24—1-[2-(2-benzothiazolethioethyl)-pyridinium]-3-(trimethylammonium)-propane dibromide Following the procedure of Examples 1 and 19, we reacted 2-(2-benzothiazolethioethyl)-pyridine with 3-bromopropyltrimethylammonium bromide and obtained 1-[2-(2-benzothiazolethioethyl) - pyridinium] - 3 - (trimethylammonium)-propane dibromide.

Example 25—1-spiro-[(1-methyloxindole)-3,4'-(1'-methylpiperidinium)] - 3 - (trimethylammonium)-propane dibromide A solution of 3.9 grams (0.017 mole) of spiro-[(1-methyloxindole)-3,4'-(1'-methylpiperidine)] [C. Eisleb, Ber. 74, 1433 (1941)] and 6.8 grams (0.026 mole) of 3-bromopropyltrimethylammonium bromide in 15 milliliters of ethanol was refluxed on the steam bath for 20 hours. The cooled solution was diluted with ethyl acetate, the precipitate collected and recrystallized twice from n-propyl alcohol and ethyl acetate to yield 3.6 grams (43 percent of the theoretical yield) of 1-spiro-[(1-methyloxindole) - 3,4' - (1'-methylpiperidinium)]-3-(trimethylammonium)-propane dibromide, melting with gas evolution at 251 degrees centigrade.

*Analysis.*—Calculated: C, 48.89; H, 6.77; Br, 32.53. Found: C, 48.79; H, 7.04; Br, 32.19.

Example 26—1-[4-(3-indolylethyl)-1-methyl-piperidinium]-3-(trimethylammonium)-propane dibromide Following the procedure of Example 25, 4-(3-indolylethyl)-1-methylpiperidine was reacted with 3-bromopropyltrimethylammonium bromide to yield 1-[4-(3-indolylethyl) - 1-methyl-piperidinium]-3-(trimethylammonium)-propane dibromide.

Example 27—1-[4-(3-indolylethyl)-1-ethylpiperidinium]-3-(trimethylammonium)-propane dibromide Following the procedure of Example 25, 4-(3-indolylethyl)-1-ethylpiperidine was reacted with 3-bromopropyltrimethylammonium bromide to yield 1-[4-(3-indolylethyl) - 1 - ethylpiperidinium]-3-(trimethylammonium)-propane dibromide, in the form of a hygroscopic solid.

*Analysis.*—Calculated: C, 53.39; H, 7.60. Found: C, 52.60; H, 7.54.

Example 28—1-(4-[6-(bicyclo-[2.2.1]-2-heptenyl)]-pyridinium)-3-(trimethylammonium)-propane dibromide Following the procedure of Example 16, 4-[6-(bicyclo-[2.2.1]-2(heptenyl)]-pyridine was refluxed in isopropyl alcohol with 3-bromopropyltrimethylammonium bromide to yield 1 - (4 - [6-(bicyclo-[2.2.1]-2-heptenyl)]-pyridinium)-3-(trimethylammonium)-propane dibromide as a hygroscopic glass after drying in vacuo over phosphorus pentoxide.

*Analysis.*—Calculated: Br, 36.98. Found: Br, 37.14.

Example 29—1-(3-carbanilidopyridinium)-3-(trimethylammonium)-propane dibromide

An acetonitrile solution of 5.9 grams (0.03 mole) of nicotinic acid anilide and 7.8 grams (0.03 mole) of 3-bromopropyltrimethylammonium bromide was refluxed on the steam bath for 25 hours. The precipitate was collected and recrystallized from ethanol to yield 12.0 grams (87 percent of the theoretical yield) of 1-(3-carbanilidopyridinium) - 3-(trimethylammonium)-propane dibromide, melting at 179–181.5 degrees centigrade.

*Analysis.*—Calculated: C, 47.07; H, 5.50; Br, 34.80. Found: C, 46.99; H, 5.51; Br, 34.34.

Example 30—1-(3-carbobenzyloxypyridinium)-3-(trimethylammonium)-propane dibromide Following the procedure of Example 29, we obtained 1 - (3 - carbobenzyloxypyridinium) - 3-(trimethylammonium)-propane dibromide by reacting benzyl nicotinate with 3-bromopropyltrimethylammonium bromide.

Example 31—1-(2-piperidinopyridinium)-3-(trimethylammonium)-propane dibromide

Following the procedure of Example 29, we obtained 1 - (2 - piperidinopyridinium)-3-(trimethylammonium)-propane dibromide by reacting 2-piperidinopyridine with 3-bromopropyltrimethylammonium bromide.

Example 32—1-[2-(2-oxo-3-methylpentyl)-pyridinium]-3-(trimethylammonium)-propane dibromide Following the procedure of Example 1, we reacted 2-(2-oxo-3-methylpentyl)-pyridine with 3-bromopropyltrimethylammonium bromide and we obtained 1-[2-(2-oxo - 3 - methylpentyl)-pyridinium]-3-(trimethylammonium)-propane dibromide.

Example 33—1-[2-(2-oxo-3-carbethoxypentyl)-pyridinium]-3-(trimethylammonium)-propane dibromide Following the procedure of Example 1, we reacted 2-(2-oxo-3-carbethoxypentyl)-pyridine with 3-bromopropyltrimethylammonium bromide and we obtained 1-[2-(2 - oxo - 3-carbethoxypentyl)-pyridinium]-3-(trimethylammonium)-propane dibromide in the form of a hygroscopic solid.

Example 34—1-[4-(diphenylmethyl)-pyridinium]3-(trimethylammonium)-propane dibromide Following the procedure of Example 1, we reacted 4-(diphenylmethyl)-pyridine with 3-bromopropyltrimethylammonium bromide and we obtained 1-[4-diphenylmethyl) - pyridinium]-3-(trimethylammonium)-propane dibromide in the form of a hygroscopic solid. Melting point (decomposition), 145–150 degrees centigrade.

Example 35—1-[4-(1,2-diphenylethenyl)-pyridinium]-3-(trimethylammonium)-propane dibromide Following the procedure of Example 1, we reacted 4-(1,2-diphenylethenyl)-pyridine with 3-bromopropyltrimethylammonium bromide and we obtained 1-[4-(1,2-diphenylethenyl) - pyridinium]-3-(trimethylammonium)-propane dibromide.

Example 36—1-[4-(triphenylmethyl)-pyridinium]-3-(trimethylammonium)-propane dibromide Following the procedure of Example 1, we reacted 4-(triphenylmethyl)-pyridine with 3-bromopropyltrimethylammonium bromide and we obtained 1-[4-(triphenylmethyl) - pyridinium]-3-(trimethylammonium)-propane dibromide as a crystalline solid.

Example 37—1-(2-[(1-naphthyl)-ethyl]-pyridinium)-3-(trimethylammonium)-propane dibromide Following the procedure of Example 1, we reacted 2-[(1-naphthyl)-ethyl]-pyridine with 3-bromopropyltrimethylammonium bromide and we obtained 1-(2-[(1-naphthyl) - ethyl]-pyridinium)-3-(trimethylammonium)-propane dibromide having a melting point with decomposition of 170–171 degrees centigrade.

*Analysis.*—Calculated: C, 55.88; H, 6.12; Br, 32.33. Found: C, 56.15; H, 6.36; Br, 31.58.

Example 38—1(4-[(1-naphthyl)-ethyl]-pyridinium)-3-(trimethylammonium)-propane dibromide Following the procedure of Example 1, we reacted 4-[(1-naphthyl)-ethyl]-pyridine with 3-bromopropyltrimethylammonium bromide and we obtained 1-(4-[(1-naphthyl) - ethyl]-pyridinium)-3-(trimethylammonium)-propane dibromide.

Example 39—1-(4-[3-(9-fluorenecarboxy)-propyl]-pyridinium)-3-(trimethylammonium)-propane dibromide Following the procedure of Example 1, we reacted 4-[3-(9-fluorenecarboxy)-propyl]-pyridine with 3 - bromopropyltrimethylammonium bromide and we obtained 1-(4-[3 - (9-fluorenecarboxy)-propyl]-pyridinium)-3-(trimethylammonium)-propane dibromide.

Example 40—1-[2-(3-indolylethyl)-1-methylpiperidinium]-3-(trimethylammonium)-propane dibromide Following the procedure of Example 1, we reacted 2-(3 - indolylethyl) - 1 - methylpiperidine with 3-bromopropyltrimethylammonium bromide and we obtained 1-[2-(3 - indolylethyl) - 1 - methylpiperidinium] - 3 - (trimethylammonium)-propane dibromide.

Example 41—1-[2-(phenylethylamino)-pyridinium]-3-(trimethylammonium)-propane dibromide Following the procedure of Example 1, we reacted 2-(phenylethylamino)-pyridine with 3-bromopropyltrimethylammonium bromide and we obtained 1 - [ 2 - (phenylethylamino) - pyridinium] - 3 - (trimethylammonium)-propane dibromide.

Example 42—1-[2-(2-pyridylamino)-pyridinium]-3-(trimethylammonium)-propane dibromide Following the procedure of Example 1, we reacted 2,2'-dipyridylamine with 3 - bromopropyltrimethylammonium bromide and we obtained 1-[2-(2-pyridylamino)-pyridinium]-3-(trimethylammonium)-propane dibromide.

Example 43—1-spiro-[fluorene-9,4'-(1'-methylpiperidinium)]-3-(trimethylammonium)-propane dibromide Following the procedure of Example 25, we reacted spiro - [fluorene - 9,4' - (1' - methylpiperidine)] with 3-bromopropyltrimethylammonium bromide and we obtained 1 - spiro - [fluorene - 9,4' - (1' - methylpiperidinium)] - 3 - (trimethylammonium) - propane dibromide melting with decomposition at 274 degrees centigrade.

*Analysis.*—Calculated: C, 56.48; H, 6.71; Br, 31.32. Found: C, 56.06; H, 6.92; Br, 30.87.

Example 44—1-[4-(1-methyl-3-indolylethyl)-pyridinium]-3-(trimethylammonium)-propane dibromide A solution of 12.0 grams (0.049 mole) of 4-(1-methyl-3-indolylethyl)-pyridine and 9.15 grams (0.035 mole) of 3 - bromopropyltrimethylammonium bromide in 50 milliliters of acetonitrile was refluxed for 25 hours. The solvent was decanted from the oily precipitate, the oil dissolved in ethanol and reprecipitated with ether and the procedure repeated. The oily product was dried in vacuo at room temperature over phosphorus pentoxide to give 5.65 grams (32 percent of the theoretical yield) of an orange-colored hygroscopic product, 1 - [4 - (1 - methyl - 3-indolylethyl)-pyridinium] - 3 - (trimethylammonium) - propane dibromide, which was then recrystallized from isopropyl alcohol to yield yellow, hygroscopic needles.

*Analysis.* — Calculated: C, 53.13; H, 6.28; Br, 32.14. Found: C, 52.83; H, 6.47; Br, 31.98.

This compound was tested on laboratory animals and humans with the following results:

I. Hypotensive effects in anesthetized dogs (following standard test procedure).

| Dose (mg./kg.), I.V. | Percent B.P. Fall | Duration (hours) |
|---|---|---|
| 0.01 | | |
| 0.02 | 25 | >3 |
| 0.025 | 50 | 4 |
| 0.05 | 50 | >2 |
| 0.1 | 55 | >3 |

II. Acute toxicity—mice, mg./kg. [by procedure of B. Behrens and G. Karber published in the Archives for Experimental Pathology and Pharmacology, 177, page 379 (1934)].

I.V. $LD_{50}=9.0$

III. Ganglionic Blockade—cat, superior cervical ganglia [by procedure of G. H. Acheson and S. A. Pereira, published in the Journal of Pharmacology and Experimental Therapeutics, 87, page 273 (1946)].

| Dose (mg./kg., I.V.) | Degree (0–4+) | Duration (hours) |
|---|---|---|
| 0.05 | | |
| 0.1 | + | 0.2 |
| 0.5 | ++ | 0.5–0.75 |
| 1.0 | +++ | 2 |
| 2.0 | ++++ | ? |

IV. Effect on pupil — cat, male, unanesthetized (by standard intra-speritoneal injection).

| Dose (mg./kg., I.V.) | Dilatation | Reaction to Light |
|---|---|---|
| 0.1 | None | O.K. |
| 0.25 | Partial | Partial. |
| 0.5 | Complete | None. |

V. Effects when administered I.V. to an unanesthetized monkey.

Monkey—6.7 kg. male.
Dose=3.0 mg. total dose.
Results: No noticeable effects acutely or within 24 hours. The animal was observed closely for evidences of ganglionic blockade (e.g., dilatation of pupils, dry mouth, etc.) but no such effects were noted.

VI. Test on 9 human hypertensive patients (by intravenous injection in isotonic saline solution).

Intravenous average dose (mg./kg)—0.15.
Average percent B.P. fall—supine, 20; erect, 30.

Example 45 — 1 - [4 - (1-methyl-3-indolylethyl)-pyridinium] - 3-(trimethylammonium)-propane monochloride, monobromide We obtained the mixed salt, 1-[4-(1-methyl-3-indolylethyl)-pyridinium]-3-trimethylammonium)-propane monochloride, monobromide by heating equimolar quantities of 4 - (1 - methyl - 3 - indolylethyl) - pyridine and 3-chloropropyltrimethylammonium bromide in dimethyl formamide solution for 20 hours at 125 degrees centigrade (oil bath temperature), and collecting the precipitated product from the cooled reaction mixture. The yield was 80 percent of the theoretical.

Example 46—1-[4-(1-methyl-3-indolylethyl)-pyridinium]-3-(trimethylammonium)-propane dichloride A solution of 25 grams of 1 - [4-(1-methyl-3-indolylethyl) - pyridinium] - 3 - (trimethylammonium)-propane dibromide salt dissolved in 500 milliliters of methanol was passed through a column of Amberlite anion exchange resin IRA 401 (previously regenerated with a solution of sodium chloride) and the column was washed with fresh methanol. The eluate was concentrated in vacuo and the residue recrystallized from acetonitrile. There was thus obtained 16.5 grams (81 percent of the theoretical yield) of the 1 - [4 - (1-methyl-3-indolylethyl)-pyridinium]-3-(trimethylammonium)propane dichloride salt, melting with decomposition at 195 degrees centigrade.

*Analysis.*—Calculated: Cl, 17.36. Found: Cl, 17.30.

Example 47—1-[2-(3-indolylethyl)-5-ethylpyridinium]-3-trimethylammonium)-propane dibromide A mixture of 10 grams (0.04 mole) of 2-(3-indolylethyl)-5-ethylpyridine and 5.2 grams (0.02 mole) of 3-bromopropyltrimethylammonium bromide dissolved in 50 milliliters of acetonitrile was refluxed for 24 hours. The solution was cooled, the precipitate filtered off and recrystallized twice from isopropyl alcohol and ethyl acetate and finally twice from isopropyl alcohol alone. The resultant, still impure material was dissolved in 25 milliliters of acetonitrile and refluxed for five hours with an additional four grams of 2-(3-indolylethyl)-5-ethyl-pyridine. Recrystallization of the resultant product from isopropyl alcohol gave 1.4 grams (13.5 percent of the theoretical yield) of white hygroscopic product, 1-[2-(3-indolylethyl) - 5 - ethylpyridinium] - 3 - (trimethylammonium)-propane dibromide.

*Analysis.*—Calculated: ionic Br, 31.26. Found: 30.79.

Example 48—1-[2-(1-methyl-3-indolylethyl)-pyridinium]-3-(trimethylammonium)-propane dibromide Following the procedure of Example 44, and reacting 2-(1-methyl-3-indolylethyl)-pyridine with 3-bromopropyl-trimethylammonium bromide, we obtained 1-[2-(1-methyl - 3 - indolylethyl) - pyridinium] - 3 - (trimethylammonium)-propane dibromide, as a solid melting with decomposition at 139–140 degrees centigrade.

*Analysis.*—Calculated: C, 53.13; H, 6.28; Br, 32.14. Found: C, 53.26; H, 5.96; Br, 31.83.

Example 49—1-[2-(1-methyl-3-indolylethyl)-5-ethylpyridinium]-3-(trimethylammonium)-propane dibromide Following the procedure of Example 44, and reacting 2 - (1 - methyl - 3 - indolylethyl) - 5 - ethylpyridine with 3-bromo-propylthimethylammonium bromide, we obtained 1 - [2 - (1 - methyl - 3 - indolylethyl) - 5 - ethylpyridinium] - 3 - (trimethylammonium) - propane dibromide as a solid which melted with decomposition at 173–174 degrees centigrade.

*Analysis.*—Calculated: C, 54.86; H, 6.72; Br, 30.42. Found: C, 54.21; H, 6.53; Br, 30.28.

This compound was tested on laboratory animals and humans with the following results:

I. Hypotensive effects in anesthetized dogs (following standard test procedure)

| Dose (mg./kg.), I.V. | Percent B.P. Fall | Duration (hours) |
| --- | --- | --- |
| 0.01 | [1] 55 | >3 |
| 0.025 | [1] 55 | >3 |
| 0.05 | 50–55 | >3 |
| 0.1 | 50–65 | >3 |

[1] Slow falls over a 30–45 min. period.

II. Acute toxicity—mice, mg./kg. [by procedure of B. Behrens and G. Karber published in the Archives for Experimental Pathology and Pharmacology, 177 page 379 (1934)].

I.V. $LD_{50}=7.5$

III. Ganglionic Blockade—cat, superior cervical ganglion [by procedure of G. H. Acheson and S. A. Pereira, published in the Journal of Pharmacology and Experimental Therapeutics, 87 page 273 (1946)].

| Dose (mg./kg., I.V.) | Degree (0-4+) | Duration (hours) |
| --- | --- | --- |
| 0.1 | | |
| 0.25 | | |
| 0.5 | | |
| 1.0 | + | 0.25 |
| 2.0 | ++ | 0.4 |
|  | +++ | 0.5 |

IV. Effect on pupil—cat, male, unanesthetized (by standard intra-peritoneal injection).

| Dose (mg./kg., I.P.) | Dilatation | Reaction to Light |
| --- | --- | --- |
| 0.1 | None | O.K. |
| 0.25 | do | O.K. |
| 0.5 | Complete [1] | None. |

[1] Duration of approximately 2 hours.

V. Effects when administered I.V. to an unanesthetized monkey.

Monkey—7. kg. male.
Dose=3.0 mg., total dose (or 0.4 mg./kg.).
Results: No noticeable effects. The animal was observed closely for evidence of ganglionic blockade and dilatation of the pupils but no such efforts were noted.

VI. Test on 5 human hypertensive patients (by intravenous injection in isotonic saline solution).
Intravenous average dose (mg./kg.) 0.13.
Average percent B.P. fall.—supine, 18; erect, 32.

Example 50—1-[4-(1-benzyl-3-indolylethyl)-pyridinium[-3-(trimethylammonium)-propane dibromide Following the procedure of Example 19, we reacted 4 - (1 - benzyl - 3 - indolylethyl) - pyridine with 3-bromopropyl - trimethylammonium bromide and obtained 1 - [4 - (1 - benzyl - 3 - indolylethyl) - pyridinium] - 3 - (trimethylammonium) - propane dibromide as a solid which melted with decomposition at 191–194 degrees centigrade.

*Analysis.*—Calculated: C, 58.64; H, 6.15; Br, 27.87. Found: C, 58.36; H, 5.95; Br, 27.34.

Example 51—1-(2-[1-(1-methyl-3-indolyl)-2-propylpyridinium-3-(trimethylammonium)-propane dibromide Following the procedure of Example 44, we reacted 2 - [1 - (1 - methyl - 3 - indolyl) - 2 - propyl] - pyridine with 3 - bromopropyltrimethylammonium bromide and obtained 1 - (2 - [1 - (1 - indolyl) - 2 - propyl]-pyridinium) - 3 - (trimethylammonium) - propane dibromide.

Example 52—1-[4-(1-indolylethyl)-pyridinium]-3-(trimethylammonium)-propane dibromide Following the procedure of Example 19, we reacted 4 - (1 - indolylethyl) - pyridine with 3 - bromopropyl-trimethylammonium bromide and obtained 1 - [4-indolylethyl) - pyridinium] - 3 - (trimethylammonium)-propane dibromide in the form of a solid which melted with decomposition at 223–225 degrees centigrade.

*Analysis.*—Calculated: C, 52.18; H, 6.05; Br, 33.07. Found: C, 51.79; H, 5.87; Br, 32.63.

This compound was tested on laboratory animals and humans with the following results:

I. Hypotensive effects in anesthetized dogs (following standard test procedure).

| Dose (mg./kg., I.V.) | Percent B.P. Fall | Duration (hours) |
| --- | --- | --- |
| 0.0025 | 0 | 0 |
| 0.005 | 12 | 1 |
| 0.01 | 65 | >2 |
| 0.05 | 65 | >2 |
| 0.1 | 70 | >2 |
| 0.5 | 60 | >2 |

Regardless of the dose administered, all of the B.P. responses were similar in that the falls occurred over a 20–40 minute period.

II. Acute toxicity—mice, mg./kg. [by procedure of B. Behrens and G. Karber published in the Archives for Experimental Pathology and Pharmacology, 177 page 379 (1934)].

1 hour I. V. $LD_{50}=18.25$
24+ hour I. V. $LD_{50}=8.25$

III. Ganglionic Blockade—cat, superior cervical ganglion [by procedure of G. H. Acheson and S. A. Pereira, published in the Journal of Pharmacology and Experimental Therapeutics, 87 page 273 (1946)].

| Dose (mg./kg., I.V.) | Degree (0-4+) | Duration (hours) |
| --- | --- | --- |
| 0.01–0.05 | 0 | 0 |
| 0.1 | + | 0.25 |
| 0.25 | +++ | >0.25 |

IV. Effect on pupil—cat, male, unanesthetized (by standard intra-peritoneal injection).

| Dose (mg./kg., I.P.) | Dilatation | Reaction to Light |
|---|---|---|
| .1 | Partial | Partial. |
| .25 | Complete | None. |

V. Effects when administered I.V. to an unanesthetized monkey.

Monkey, 7 kg., male.
Dose=3.0 mg., total dose (or 0.4 mg./kg.).
Results: No noticeable effects acutely or within a period of 96 hours after administration of the compound. There were no gross symptoms of ganglionic blockade.

VI. Test on 4 human hypertensive patients (by intravenous injection in isotonic saline solution).
Intravenous average dose (mg./kg.)—0.13.
Average percent B.P. fall—supine, 16; erect, 34.

Example 53.—1-[2-(1-benzotriazolylethyl)-pyridinium]-3-(trimethylammonium)-propane dibromide Following the procedure of Example 19, we reacted 2-(1-benzotriazolylethyl)-pyridine with 3-bromopropyltrimethylammonium bromide, and obtained 1-[2-(1-benzotriazolylethyl) - pyridinium] - 3 - (trimethylammonium)-propane dibromide in the form of a white hygroscopic solid.

*Analysis.*—Calculated: Br, 32.88. Found: Br, 32.30.

Example 54.—1-[2-(1-indenylethyl)-pyridinium]-3-(trimethylammonium)-propane dibromide Following the procedure of Example 44, we reacted 2-(1-indenylethyl)-pyridine with 3-bromopropyltrimethylammonium bromide, and obtained 1-[2-(1-indenylethyl)-pyridinium]-3-(trimethylammonium)-propane dibromide in the form of a solid which melted with decomposition at 188–190 degrees centigrade.

*Analysis.*—Calculated: C, 54.78; H, 6.27; Br, 33.14. Found: C, 52.44; H, 6.42; Br, 32.68.

Example 55.—1-[2-(1-methyl-3-oxindolylethyl)-pyridinium]-3-(trimethylammonium)-propane dibromide Following the procedure of Example 44, we reacted 2-(1-methyl-3-oxindolylethyl)-pyridine with 3-bromopropyltrimethylammonium bromide and obtained 1-[2-(1-methyl - 3 - oxindolylethyl) - pyridinium] - 3 - (trimethylammonium)-propane dibromide.

Example 56.—1-[4-(benzyloxyethyl)-pyridinium]-3-(trimethylammonium)-propane dibromide Following the procedure of Example 19, we reacted 4 - (benzyloxyethyl) - pyridine with 3 - bromopropyltrimethylammonium bromide and obtained 1-[4-(benzyloxyethyl)-pyridinium]-3 - (trimethylammonium)-propane dibromide.

Example 57.—1-[4-(benzylthioethyl)-pyridinium]-3-(trimethylammonium)-propane dibromide Following the procedure of Example 1, we reacted 4-benzylthioethyl)-pyridine with 3-bromopropyltrimethylammonium bromide and obtained 1-[4-(benzylthioethyl)-pyridinium]-3-(trimethylammonium)-propane dibromide.

Example 58.—1-[4-(9-fluorenethioethyl)-pyridinium]-3-(trimethylammonium)-propane dibromide Following the procedure of Example 1, we reacted 4-(9-fluorenethioethyl)-pyridine with 3-bromopropyltrimethylammonium bromide and obtained 1-[4-(9-fluorenethioethyl)-pyridinium] - 3 - (trimethylammonium) - propane dibromide, melting with gas evolution at 202–204 degrees centigrade.

Example 59.—1-(2-[6-(bicyclo-[2.2.1]-2-heptenyl)]-pyridinium)-3-(trimethylammonium)-propane dibromide Following the procedure of Example 19, we reacted 2-[6-(bicyclo-[2.2.1]-2-heptenyl)]-pyridine with 3-bromopropyltrimethylammonium bromide and we obtained 1-(2-[6 - (bicyclo - [2.2.1] - 2 - heptenyl)] - pyridinium)-3-(trimethylammonium)-propane dibromide as a hygroscopic solid.

Example 60.—1 - (5 - [6 - (bicyclo - [2.2.1]-2-heptenyl)] - 2 - picolinium) - 3 - (trimethylammonium) - propane dibromide Following the procedure of Example 44, we reacted 5-[6 - (bicyclo - [2.2.1] - 2 - heptenyl)] - 2 - picoline with 3-bromopropyltrimethylammonium bromide and we obtained 1-(5-[6-(bicyclo - [2.2.1] - 2 - heptenyl)] - 2 - picolinium)-3-(trimethylammonium)-propane dibromide as a hygroscopic solid.

*Analysis.*—Calculated: Br, 35.82. Found: 35.58.

Example 61.—1-(4-[beta-(1 - methyl - 3 - indolyl)-alpha-cyclohexylethyl] - pyridinium) - 3 - trimethylammonium)-propane dibromide Following the procedure of Example 19, we reacted 4-[beta-(1-methyl - 3 - indolyl) - alpha - cyclohexylethyl]-pyridine with 3-bromopropyltrimethylammonium bromide and we obtained 1-(4-[beta-(1-methyl-3-indolyl)-alpha-cyclohexylethyl]-pyridinium) - 3 - (trimethylammonium)- propane dibromide, melting at 237–239 degrees centigrade.

Example 62.—1-(4-[beta-(1-methyl-3-indolyl)-alpha-(4-ethylcyclohexyl) - ethyl] - pyridinium) - 3 - (trimethylammonium)-propane dibromide Following the procedure of Example 19, we reacted 4-[beta-(1-methyl-3-indolyl) - alpha-(4-ethylcyclohexyl)-ethyl]-pyridine with 3-bromopropyltrimethylammonium bromide and we obtained 1-(4-[beta-(1-methyl-3-indolyl)-alpha - (4 - ethylcyclohexyl) - ethyl] - pyridinium)-3-(trimethylammonium)-propane dibromide, melting with decomposition at 150 degrees centigrade.

Example 63.—1-[3-(2-indolyl)-pyridinium]-3-(trimethylammonium)-propane dibromide Following the procedure of Example 19, we reacted 3-(2-indolyl)-pyridine with 3-bromopropyltrimethylammonium bromide and we obtained 1-[3-(2-indolyl)-pyridinium]-3-(trimethylammonium)-propane dibromide as a solid melting at 246–250 degrees centigrade.

*Analysis.*—Calculated: C, 50.12; H, 5.54; Br, 35.11. Found: C, 50.06; H, 5.49; Br, 34.96.

Example 64.—1-[-(2-indolyl)-pyridinium]-3-(trimethylammonium)-propane dibromide

Following the procedure of Example 19, we reacted 4-(2-indolyl)-pyridine with 3-bromopropyltrimethylammonium bromide and obtained 1-[4-(2-indolyl)-pyridinium]-3-(trimethylammonium)-propane dibromide, melting at 236–238 degrees centigrade.

*Analysis.*—Calculated: Br, 35.11. Found: Br, 34.51.

Example 65.—1-[4-(3,3'-diindolylmethyl)-pyridinium]-3-(trimethylammonium)-propane dibromide Following the procedure of Example 1, we reacted 4-(3,3'-diindolylmethyl)-pyridine with 3-bromopropyltrimethylammonium bromide and obtained 1-[4-(3,3'-diindolylmethyl)-pyridinium] - 3 - (trimethylammonium)-propane dibromide as a solid melting with decomposition at 220 degrees centigrade.

*Analysis.*—Calculated: C, 57.54; H, 5.52; Br, 27.35. Found: C, 57.43; H, 5.63; Br, 26.72.

Example 66.—1-[3-(3,3'-diindolylmethyl)-pyridinium]-3-(trimethylammonium)-propane dibromide Following the procedure of Example 1, we reacted 3-(3,3'-diindolylmethyl)-pyridine with 3-bromopropyltrimethylammonium bromide and obtained 1-[3-(3,3'-diindolylmethyl) - pyridinium] - 3 - (trimethylammonium)-propane dibromide.

Example 67.—1-[2-(3,3'-diindolylmethyl)pyridinium]-3-(trimethylammonium)-propane dibromide Following the procedure of Example 1, we reacted 2-(3,3'-diindolylmethyl)-pyridine with 3-bromopropyltrimethylammonium bromide and obtained 1-[2-(3,3'-diindolylmethyl)-pyridinium] - 3 - (trimethylammonium)-propane dibromide.

Example 68.—1-(4-[bis-(1-methyl-3-indolyl)-methyl]-pyridinium)-3-(trimethylammonium) - propane dibromide Following the procedure of Example 1, we reacted 4-[bis-(1-methyl-3-indolyl)-methyl]-pyridine with 3-bromopropyltrimethylammonium bromide and obtained 1-(4-[bis - (1 - methyl-3-indolyl)-methyl]-pyridinium)-3-(trimethylammonium)-propane dibromide.

Example 69.—1-[4-(1-methyl-3-indolylethyl)-1-methylpiperidinium]-3-(trimethylammonium)-propane dibromide Following the procedure of Example 25, we reacted 4-(1-methyl-3-indolylethyl)-1-methylpiperidine with 3-bromopropyltrimethylammonium bromide and obtained 1 - [4-(1-methyl-3-indolylethyl)-1-methylpiperidinium]-3-(trimethylammonium)-propane dibromide.

Example 70.—1-[2-(1-methyl-3-indolylethyl)-1-methylpiperidinium]-3-(trimethylammonium)-propane dibromide Following the procedure of Example 25 we reacted 2-(1-methyl-3-indolylethyl)-1-methylpiperidine with 3-bromopropyltrimethylammonium bromide and obtained 1 - [2-(1-methyl-3-indolylethyl)-1-methylpiperidinium]-3-(trimethylammonium)-propane dibromide.

Example 71.—1-(4-[2-(bicyclo-[2.2.1]-heptyl)]-1-methylpiperidinium)-3-(trimethylammonium)-propane dibromide Following the procedure of Example 25, we reacted 4-[2-(bicyclo-[2.2.1]-heptyl)]-1-methylpiperidine with 3-bromopropyltrimethylammonium bromide and obtained 1-(4-[2-(bicyclo-[2.2.1]-heptyl)]-1-methylpiperidinium)-3-(trimethylammonium)-propane dibromide as a solid melting with decomposition at 258–260 degrees centigrade.

*Analysis.*—Calculated: C, 50.22; H, 8.43; Br, 35.18. Found: C, 50.26; H, 8.44; Br, 34.58.

Example 72.—1-(4-benzyl-1-methylpiperidinium)-2-(trimethylammonium)-ethane diodide A solution of 5.0 grams (0.02 mole) of 1-(dimethylaminoethyl)-4-benzylpiperidine and 7.1 grams (0.05 mole) of methyl iodide in 50 millimeters of ethanol was refluxed for 18 hours. Recrystallization of the resultant precipitate from methanol-ethyl acetate afforded 6.0 grams (56 percent of the theoretical yield) of 1-(4-benzyl-1 - methylpiperidinium)-2-(trimethylammonium)-ethane diodide as white crystals melting with decomposition at 216–218.5 degrees centigrade.

*Analysis.*—Calculated: C, 40.77; H, 6.03; I, 47.87. Found: C, 41.05; H, 5.96; I, 47.34.

Example 73.—1-[1-(2-hydroxy-1-octyl)-piperidinium]-3-(trimethylammonium)-propane dibromide Following the procedure of Example 16, we reacted 1-(2-hydroxy-1-octyl)-piperidine with 3-bromopropyltrimethylammonium bromide and obtained 1-[1-(2-hydroxy-1 - octyl)-piperidinium]-3-(trimethylammonium)-propane dibromide.

Example 74.—1-[1-(2-acetoxy-1-octyl)-piperidinium]-3-(trimethylammonium)-propane dibromide Following the procedure of Example 16, we reacted 1-(2-acetoxy-1-octyl)-piperidine wtih 3-bromopropyltrimethylammonium bromide and obtained 1-[1-(2-hydroxy-1 - octyl)-piperidinium]-3-(trimethylammonium)-propane dibromide.

Example 75.—1-[1-(2-benzoxy-1-octyl)-piperidinium]-3-(trimethylammonium)-propane dibromide Following the procedure of Example 16, we reacted 1-(2-benzoxy-1-octyl)-piperidine with 3-bromopropyltrimethylammonium bromide and obtained 1-[1-(2-benzoxy-1 - otcyl)-piperidinium]-3-(trimethylammonium)-propane dibromide.

Example 76.—1-[1-(2-hydroxy-1-decyl)-piperidinium]-3-(trimethylammonium)-propane dibromide Following the procedure of Example 16, we reacted 1-(2-hydroxy-1-decyl)-piperidine with 3-bromopropyltrimethylammonium bromide and obtained 1-[1-(2-hydroxy-1 - decyl)-piperidinium]-3-(trimethylammonium)-propane dibromide.

Example 77.—1-[1-(2-acetoxy-1-decyl)-piperidinium]-3-(trimethylammonium)-propane dibromide Following the procedure of Example 16, we reacted 1-(2-acetoxy-1-decyl)-piperidine with 3-bromopropyltrimethylammonium bromide and obtained 1-[1-(2-acetoxy-1 - decyl)piperidinium]-3-(trimethylammonium)-propane dibromide.

Example 78.—1-[1-(2-hydroxy-1-dodecyl)-piperidinium]-3-(trimethylammonium)-propane dibromide Following the procedure of Example 16, we reacted 1-(2-hydroxy-1-dodecyl)-piperidine with 3-bromopropyltrimethylammonium bromide and obtained 1-[1-(2-hydroxy-1-dodecyl)-piperidinium]-3-(trimethylammonium)-propane dibromide.

Example 79.—1-[1-(2-acetoxy-1-dodecyl)-piperidinium]-3-(trimethylammonium)-propane dibromide Following the procedure of Example 16, we reacted 1-(2-acetoxy-1-dodecyl)-piperidine with 3-bromopropyltrimethylammonium bromide and obtained 1-[1-(2-acetoxy - 1-dodecyl)-piperidinium]-3-(trimethylammonium)-propane dibromide.

Example 80.—1-[1-(2,11-dihydroxy-1-undecyl)-piperidinium]-3-(trimethylammonium)-propane dibromide Following the procedure of Example 16, we reacted 1-(2,11-dihydroxy-1-undecyl)-piperidine with 3-bromopropylthimethylammonium bromide and obtained 1-[1-(2,11 - dihydroxy-1-undecyl)-piperidinium]-3-(trimethylammonium-propane dibromide.

Example 81.—1-[1-(2,11-diacetoxy-1-undecyl)-piperidinium]-3-(trimethylammonium)-propane dibromide Following the procedure of Example 16, we reacted 1-(2,11-diacetoxy-1-undecyl)-piperidine with 3-bromopropyltrimethylammonium bromide and obtained 1-[1-(2,11-diacetoxy - 1-undecyl)-piperidinium]-3-(trimethylammonium)-propane dibromide.

Example 82.—1-[1-(2-hydroxy-2-benzyl-4-butyl)-piperiium]-3-(trimethylammonium)-propane dibromide Following the procedure of Example 16, we reacted 1-(2-hydroxy-2-benzyl-4-butyl)-piperidine with 3-bromopropyltrimethylammonium bromide and obtained 1-[1-(2-hydroxy - 2 - benzyl-4-butyl)-piperidinium]-3-(trimethylammonium)-propane dibromide.

Example 83.—1-[1-(2-phenyl-2-hydroxyethyl)-piperidinium]-3-(trimethylammonium)-propane dibromide Following the procedure of Example 16, we reacted 1-(2-phenyl-2-hydroxyethyl)-piperidine with 3-bromopropyltrimethylammonium bromide and obtained 1-[1-(2-phenyl - 2-hydroxyethyl)-piperidinium]-3-(trimethylammonium)-propane dibromide.

Example 84—1-[2-(benzoxypropyl)-pyridinium]-3-(trimethylammonium)-propane dibromide Following the procedure of Example 1, we reacted 2-(benzoxypropyl)-pyridine with 3-bromopropyltrimethylammonium bromide and obtained 1-[2-(benzoxypropyl)-pyridinium]-3-(trimethylammonium)-propane dibromide.

Example 85—1-[3-(9-fluorenecarboxymethyl)-1-methyl-piperidinium]-3-(trimethylammonium)-propane dibromide Following the procedure of Example 1, we reacted 3-(9-fluorenecarboxymethyl)-1-methyl-piperidine with 3-bromopropyltrimethylammonium bromide and obtained 1-[3-(9-fluorenecarboxymethyl) - 1-methylpiperidinium]-3-(trimethylammonium)-propane dibromide.

Example 86—1-[3-(diphenylmethoxymethyl)-1-methyl-piperidinium]-3-(trimethylammonium)-propane dibromide Following the procedure of Example 1, we reacted 3-(diphenylmethoxymethyl)-1-methylpiperidine with 3-bromopropyltrimethylammonium bromide and obtained 1-[3-(diphenylmethoxymethyl) - 1-methylpiperidinium]-3-(trimethylammonium)-propane dibromide.

Example 87—1-(4-stilbazolium)-3-(trimethylammonium)-propane dibromide

Following the procedure of Example 1 and reacting 4-picoline with 3-bromopropyltrimethylammonium bromide, we obtained 1-(4-picolinium)-3-(trimethylammonium)-propane dibromide melting at 244–245 degrees centigrade.

Analysis.—Calculated: C, 40.69; H, 6.27; Br, 45.12. Found: C, 41.08; H, 6.50; Br, 44.63.

To a solution of 6.3 grams (0.018 mole) of 1-(4-picolinium)-3-(trimethylammonium)-propane dibromide in 50 milliliters of methanol was added 3.8 grams (0.036 mole) of freshly distilled benzaldehyde and one milliliter of piperidine. After four hours reflux, the deeply colored solution was diluted with ether and the reddish-purple precipitate collected and recrystallized from ethanol. A yield of 4.3 grams (54 percent of the theoretical yield) of 1 - (4-stilbazolium)-3-(trimethylammonium)-propane dibromide, melting with gas evolution at 150 degrees centigrade and above, was obtained.

Analysis.—Calculated: C, 51.59; H, 5.94; Br, 36.14. Found: C, 51.94; H, 6.05; Br, 35.50.

Example 88—1-[4-(1-naphthylethenyl)-pyridinium]-3-(trimethylammonium)-propane dibromide In a manner similar to that of Example 87, 1-napthaldehyde was reacted with 1-(4-picolinium)-3-(trimethylammonium)-propane dibromide in an ethanol solution containing a catalytic amount of piperidine. A yield of 69 percent of the theoretical of 1-[4-(1-naphthylethenyl)-pyridinium]-3-(trimethylammonium)-propane dibromide, melting with decomposition above 178 degrees centigrade, was obtained.

Analysis.—Calculated: C, 56.11; H, 5.73; Br, 32.47. Found: C, 55.77; H, 6.25; Br, 31.90.

Example 89—1-[4-(3-indolylethenyl)-pyridinium]-3-(trimethylammonium)-propane dibromide A solution of 3.0 grams (0.021 mole) of 3-indolecarboxaldehyde and 7.3 grams (0.021 mole) of 1-(4-picolinium)-3-(trimethylammonium)-propane dibromide in 50 milliliters of ethanol containing 0.5 milliliter of piperidine was refluxed on the steam bath for four hours. The cooled reaction mixture afforded 8.8 grams of bright orange precipitate. Recrystallization from methanol and ether and then from methanol and ethyl acetate yielded 5.5 grams (56 percent of the theoretical yield) of 1-[4-(3-indolylethenyl)-pyridinium]-3-(trimethylammonium)-propane dibromide, melting with gas evolution above 275 degrees centigrade.

Analysis.—Calculated: C, 52.40; H, 5.66; Br, 33.21. Found: C, 53.06; H, 5.32; Br, 33.02.

Example 90—1-(4-[beta-(1-methyl-3-indolyl)-alpha-benzylideneethyl]pyridinium) - 3 - (trimethylammonium)-propane dibromide Following the procedure of Example 87, we reacted benzaldehyde with 1-[4-(1-methyl-3-indolylethyl)-pyridinium]-3-(trimethylammonium)-propane dibromide and obtained 1 - (4-[beta-(1-methyl-3-indolyl) - alpha-benzylideneethyl]-pyridinium) - 3 - (trimethylammonium)-propane dibromide.

The compounds which are the physical embodiments of the concept of the molecular structures comprising the present invention exhibit in particular hypotensive activities which are unrelated to the degree of ganglionic blocking activities of the compounds. The therapeutically useful properties, as a result, are greatly enhanced by these pharmacological findings and the use of therapeutically desirable compounds does not produce the commonly found undesirable side effects such as severe postural hypotension, constipation, dilation and paralysis of the pupil of the eye, dry mouth, reduction of sexual potency and the like.

It is to be understood that the invention is not to be limited to the exact compounds shown and described, as obvious modifications and equivalents will be apparent to one skilled in the art, and the invention is therefore to be limited only by the scope of the appended claims.

We claim:
1. 1-[4-(1-methyl-3-indolylethyl)pyridinium] - 3 - (trimethylammonium)-propane dibromide.
2. 1 - [2-(1-methyl-3-indolylethyl)-5-ethylpyridinium]-3-(trimethylammonium)-propane dibromide.
3. 1 - [4-(1-indolylethyl)-pyridinium]-3-(trimethylammonium)-propane dibromide.
4. 1 - [4-(3-indolylethyl)-pyridinium]-3-(trimethylammonium)-propane dibromide.
5. 1 - [2-(3-indolylethyl)-pyridinium]-3-(trimethylammonium)-propane dibromide.
6. 1-[2-(1-methyl - 3 - indolylethyl)-pyridinium]-3-trimethylammonium)-propane dibromide.

References Cited

UNITED STATES PATENTS

| | | | |
|---|---|---|---|
| 2,617,806 | 11/1952 | Erickson | 260—296 |
| 3,084,167 | 4/1963 | Rice | 260—296 |

OTHER REFERENCES

Davies et al.: "J. Chem. Soc." pp. 412–418 (1939) OD–1–C6.

HENRY R. JILES, *Primary Examiner.*

R. T. BOND, *Assistant Examiner.*